US012444228B2

(12) United States Patent
Nguyen et al.

(10) Patent No.: US 12,444,228 B2
(45) Date of Patent: Oct. 14, 2025

(54) HEAD FRAMING IN A VIDEO SYSTEM

(71) Applicant: Hewlett-Packard Development Company, L.P., Spring, TX (US)

(72) Inventors: Nhu Quynh Pham Nguyen, Austin, TX (US); Kishore Venkat Rao Goka, Leander, TX (US); Joshua Raglin, Austin, TX (US); Dhaval Patel, Austin, TX (US); Sakshi Gupta, Round Rock, TX (US); Venkateswarlu Lakkamraju, Tuam (IE); Krishna Balusu, Round Rock, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 433 days.

(21) Appl. No.: 17/971,529

(22) Filed: Oct. 21, 2022

(65) Prior Publication Data

US 2023/0401891 A1 Dec. 14, 2023

Related U.S. Application Data

(60) Provisional application No. 63/351,311, filed on Jun. 10, 2022.

(51) Int. Cl.
*G06V 40/16* (2022.01)
*H04N 7/15* (2006.01)

(52) U.S. Cl.
CPC ............ *G06V 40/161* (2022.01); *H04N 7/15* (2013.01)

(58) Field of Classification Search
CPC .... G06V 40/161; G06V 10/751; G06V 20/40; H04N 7/15; H04N 7/147
See application file for complete search history.

(56) References Cited

U.S. PATENT DOCUMENTS

| | | | |
|---|---|---|---|
| 11,165,992 B1* | 11/2021 | Ong | G06V 10/82 |
| 2013/0106988 A1* | 5/2013 | Davis | H04L 65/403 |
| | | | 348/E7.083 |
| 2019/0215464 A1* | 7/2019 | Kumar | H04N 7/08 |
| 2020/0344278 A1* | 10/2020 | Mackell | G06V 20/52 |
| 2021/0029327 A1* | 1/2021 | Shaw | H04N 23/695 |
| 2022/0303478 A1* | 9/2022 | Xu | H04N 5/2624 |

* cited by examiner

*Primary Examiner* — Nay A Maung
*Assistant Examiner* — Vaisali Rao Koppolu
(74) *Attorney, Agent, or Firm* — Quarles & Brady LLP

(57) ABSTRACT

A method may include obtaining, using a head detection model and for an image of a video stream, head detection information, where the head detection information identifies heads detected in the image, selecting a set of templates for the heads, and creating, individually, head frame definitions for the heads using the set of templates. The method may processing the video stream using the head frame definitions.

15 Claims, 21 Drawing Sheets

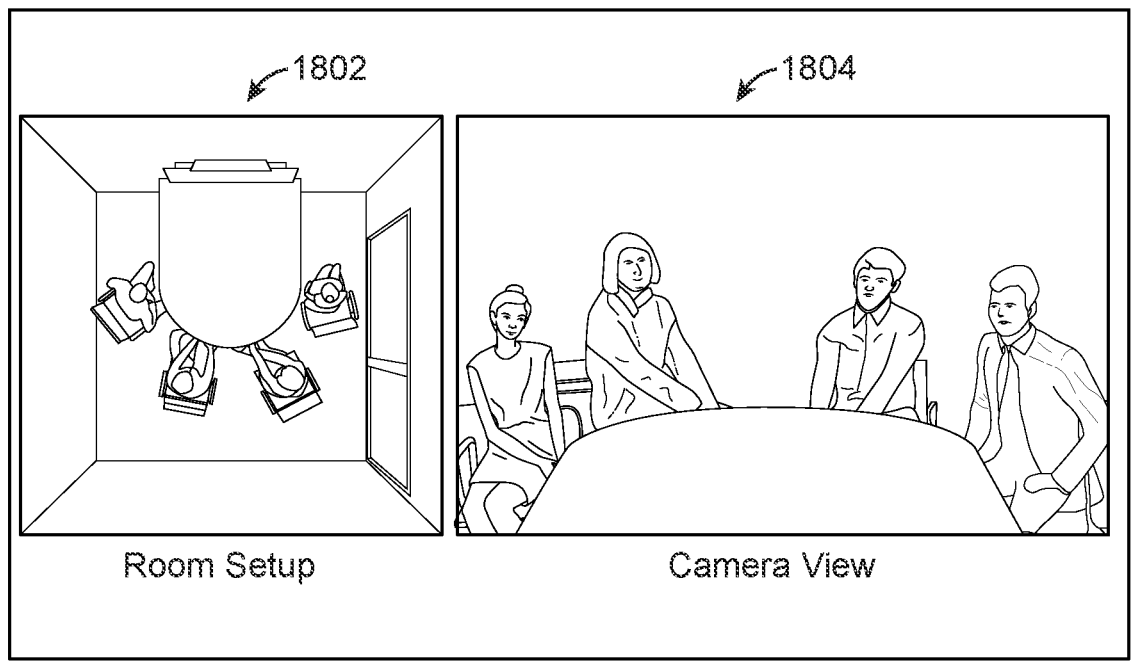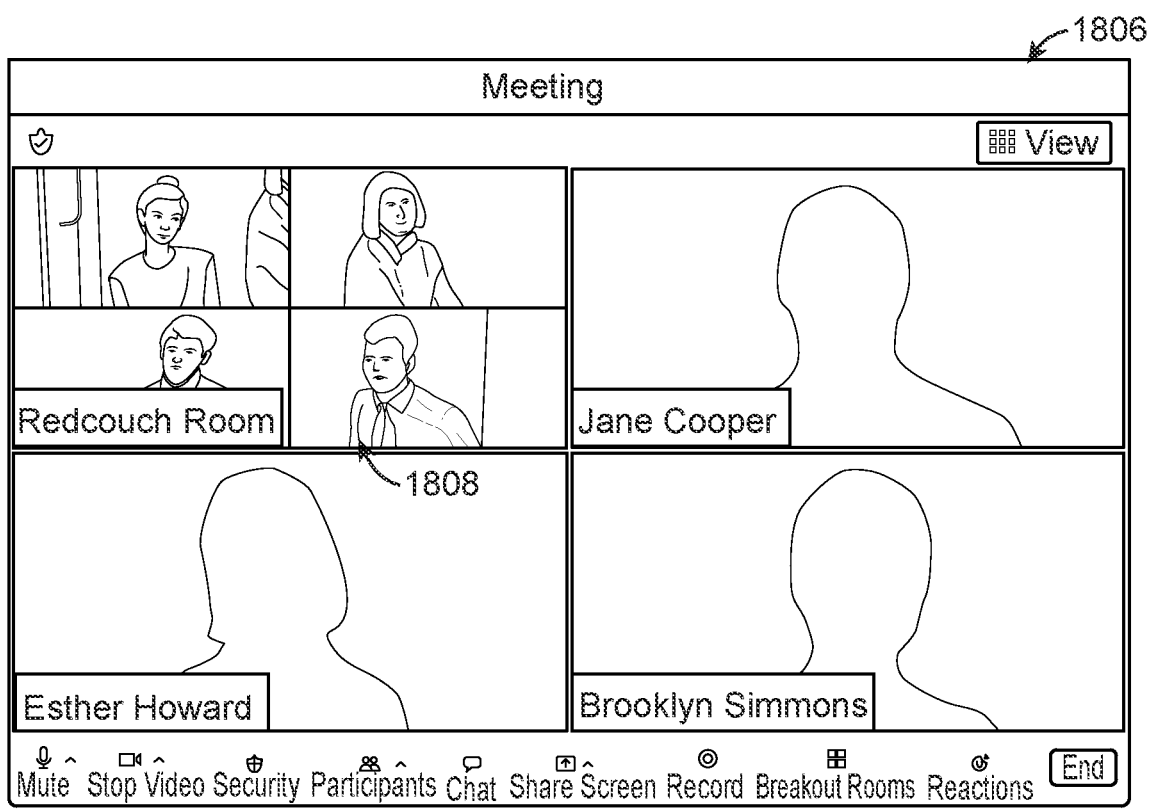
FIG. 18

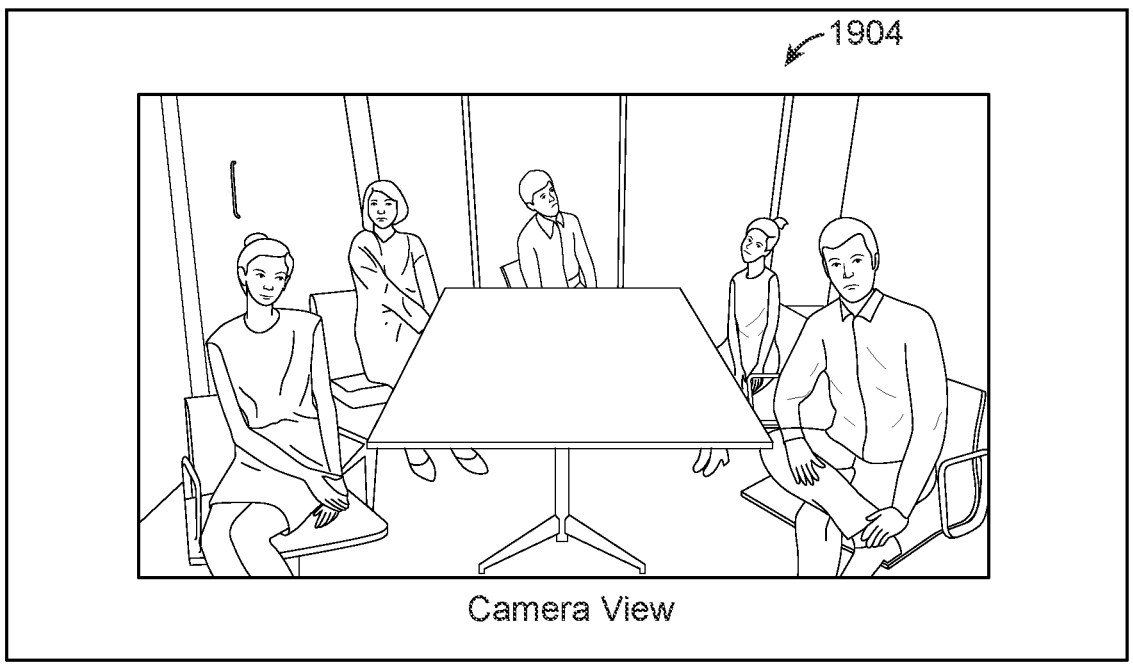
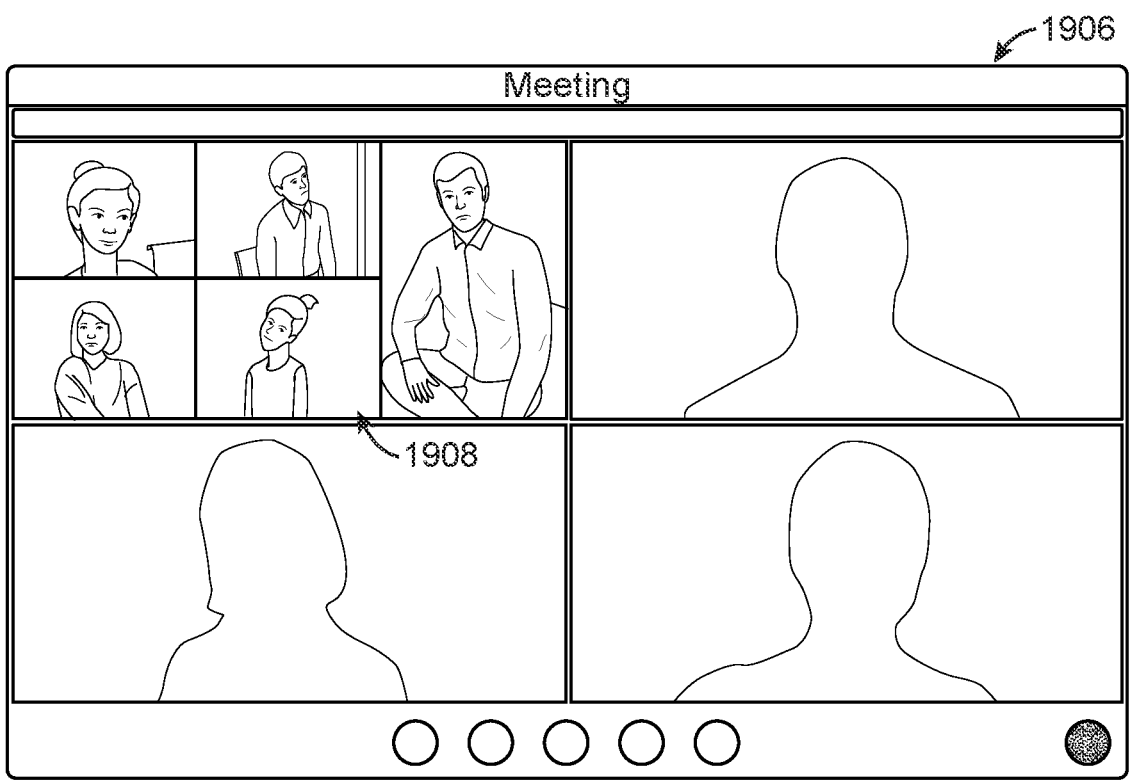
FIG. 19

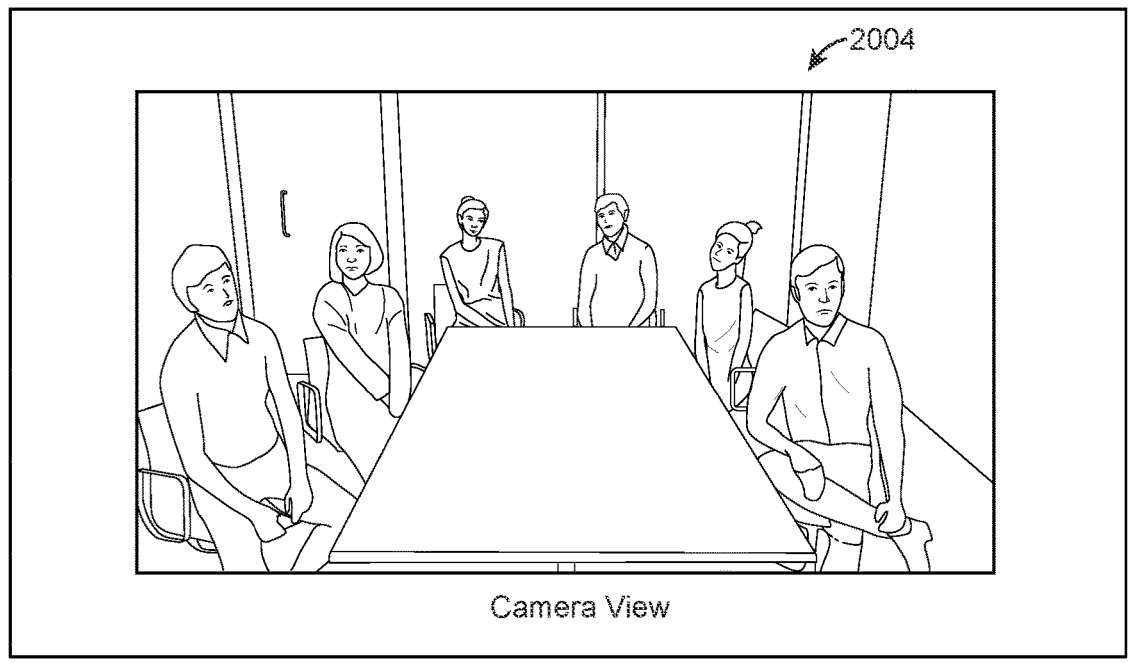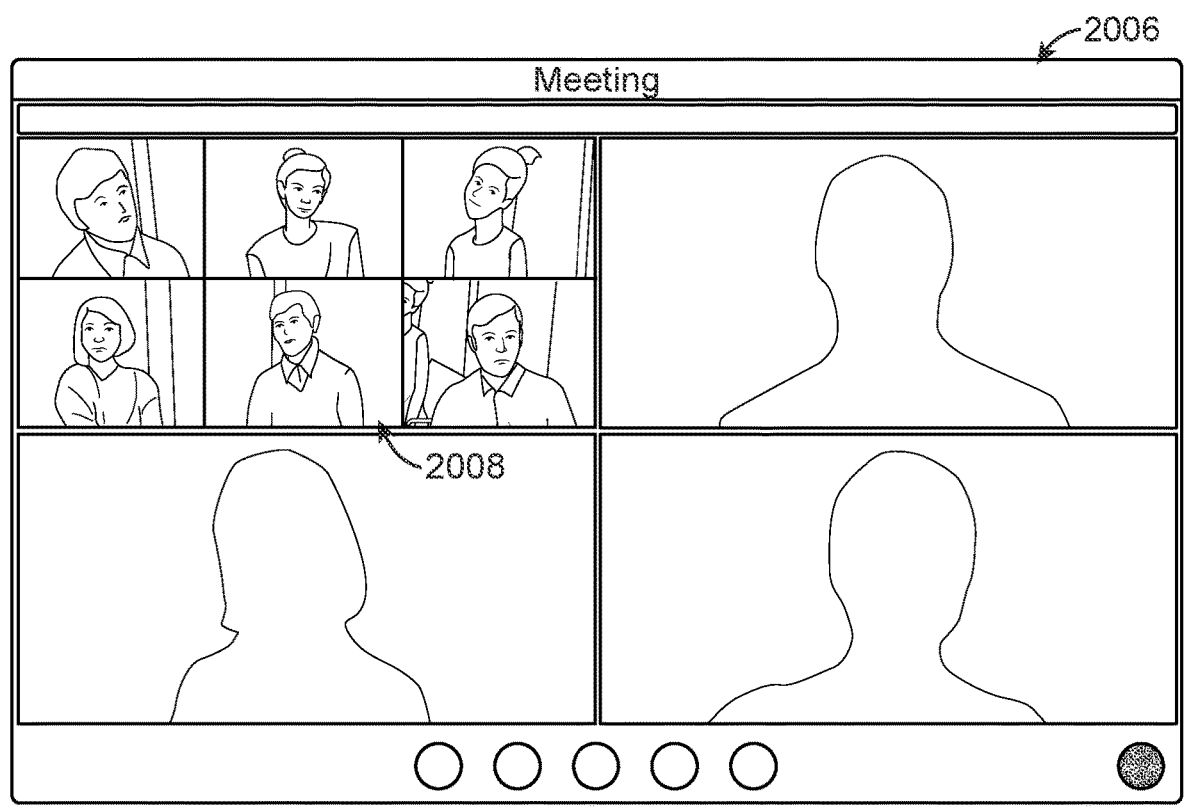
FIG. 20

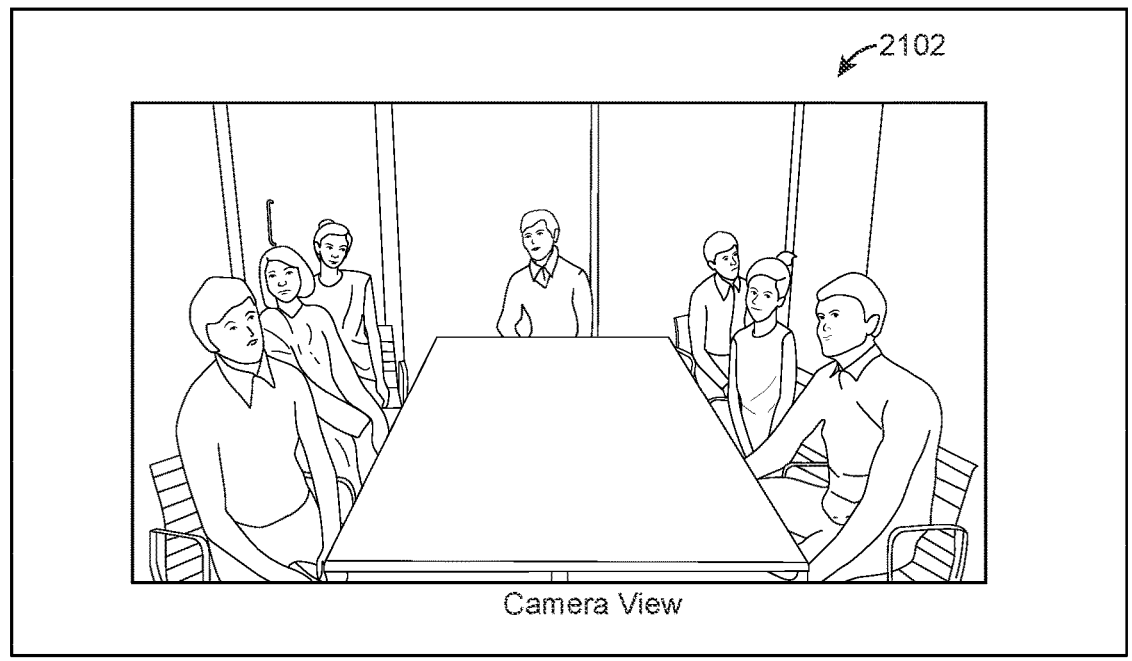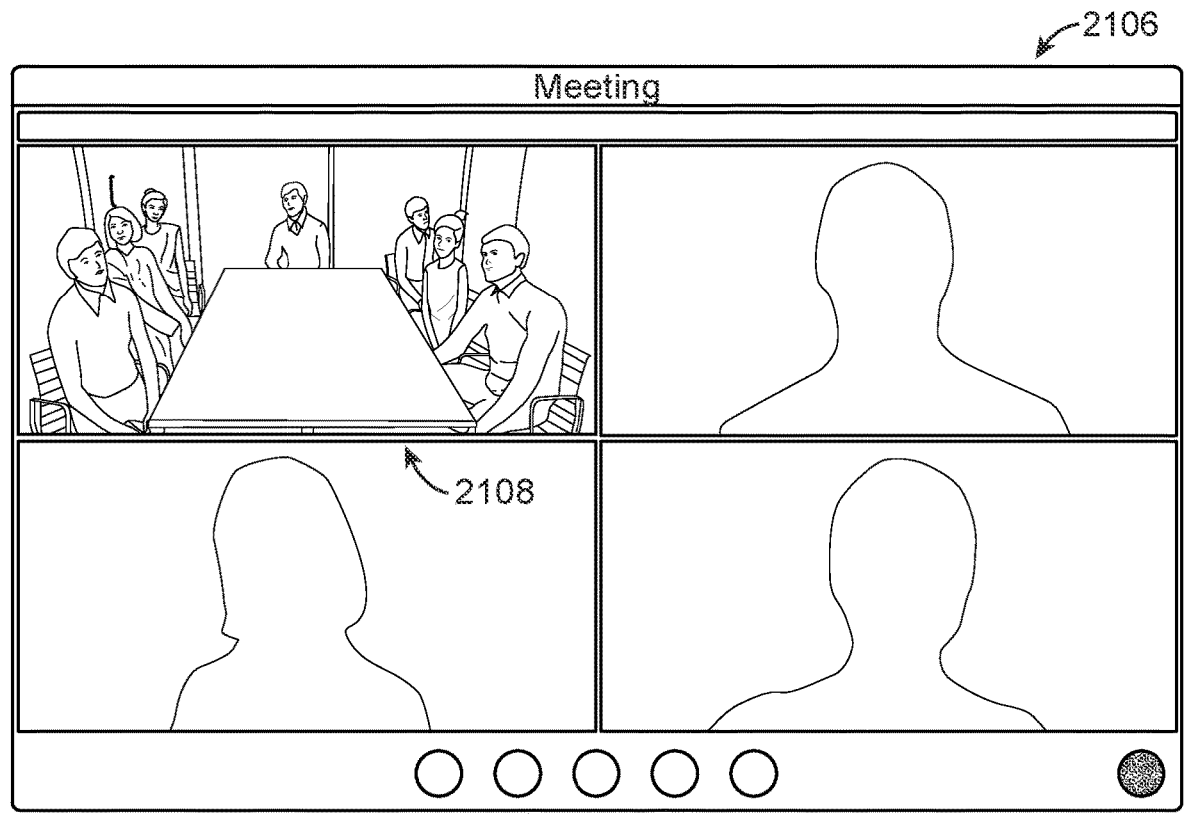
FIG. 21

HEAD FRAMING IN A VIDEO SYSTEM

CROSS REFERENCE TO RELATED APPLICATIONS

This application is a non-provisional application claiming benefit under 35 U.S.C. § 119(e) to U.S. Pat. App. Ser. No. 63/351,311 filed on Jun. 10, 2022, which is incorporated herein by reference in its entirety.

BACKGROUND

Video systems capture and process video streams. A video stream is a sequence of images captured by at least one camera. For example, a video system may be a conferencing system or a part of a conference system, or a video system may be used to capture a video stream for later playback. In some cases, the video system uses a video stream from one or more cameras, where the video stream is of multiple people in a same room. In such a scenario, the video system may perform framing operations to modify the video stream. Framing operations changes the view of a video stream, such as by cropping the images and zoom in on a portion of the images.

SUMMARY

In one general aspect, a method may include obtaining, using a head detection model and for an image of a video stream, head detection information, where the head detection information identifies heads detected in the image. The method may also include selecting a layout based on a number of the heads detected in the image, identifying a set of templates corresponding to a layout, and creating, individually, head frame definitions for the heads using the set of templates. The method may moreover include generating an image frame definition combining the head frame definitions, and processing the video stream using the image frame definition.

In one general aspect, a system may include a video processor having a head detection model configured to generate head detection information for an image of a video stream, where the head detection information identifies heads detected in the image, and a frame generator configured to generate an image frame detection information for an image of an input video stream, where generating the image frame definition may include selecting a layout based on a number of the heads detected in the image; identifying a set of templates corresponding to a layout; creating, individually, head frame definitions for the heads using the set of templates, and generating an image frame definition combining the head frame definitions. The system may also include an image framing processor configured to process the video stream using the image frame definition.

In one general aspect, the method may include obtaining, using a head detection model and for an image of a video stream, head detection information, where the head detection information identifies heads detected in the image, selecting a set of templates for the heads, and creating, individually, head frame definitions for the heads using the set of templates. The method may processing the video stream using the head frame definitions.

Other aspects of the invention will be apparent from the following description and the appended claims.

BRIEF DESCRIPTION OF DRAWINGS

FIGS. 9, 10, 11, 12, 13, 14, 15, 16, 17, 18, 19, 20, and 21 show examples in accordance with one or more embodiments.

Like elements in the various figures are denoted by like reference numerals for consistency.

DETAILED DESCRIPTION

In general, embodiments of the disclosure are directed to performing, by a video system, head framing of multiple heads in conference room. The video system is any system in which a video stream is captured by a camera, such as a conference call, video recording, or a live single room conference or gathering which is captured by a camera. A frame is portion of an image of a video stream. Specifically, a frame is a sub-image of an image of the video stream. Specifically, many room cameras for conference rooms have field of view that covers substantially the whole room. Thus, when people are in meetings in a conference room, the conference rooms camera captures whole room view. However, people in the conference room may be small comparative to the whole room view and an uneven size as compared to each other. For example, people further away from the camera may be small while people close to the camera are larger. The sending of the whole room view creates an experience far end where the end user sees much of the room environment (i.e., unused areas of the room), some larger heads of some people and some smaller heads of the people further in the room. This creates a meeting inequity whereby a focus is on some participants and less focus is on other participants that are away from the camera.

Head framing is a framing technique that creates multiple frames for the different people in a conference room, whereby the focus of the frame is a person's head. Each individual person in the conference may have their own frame, even though the conference room has multiple people. The individual frames of the conference room are concurrently transmitted. In at least some embodiments, the concurrent transmission is grouping the head frames into an image frame.

To perform head framing, one or more embodiments use a machine learning model that identifies the heads of people in the room. Next, the number of heads that are detected is determined. The layout for the number of heads is determined that matches the number of heads. Further, a set of templates are selected according to the layout. The heads of people are assigned to the templates. For each head, the corresponding template is applied to create a head frame definition defining a mapping between a portion of the images of the video stream and the locations in the layout. The collection of head frame definitions define which portions of an image of a video stream is transmitted and which portions of the video stream is not transmitted. Notably, while each portion is contiguous in a particular head frame, the portions may be separate or overlapping from each other portion.

Figure 1:
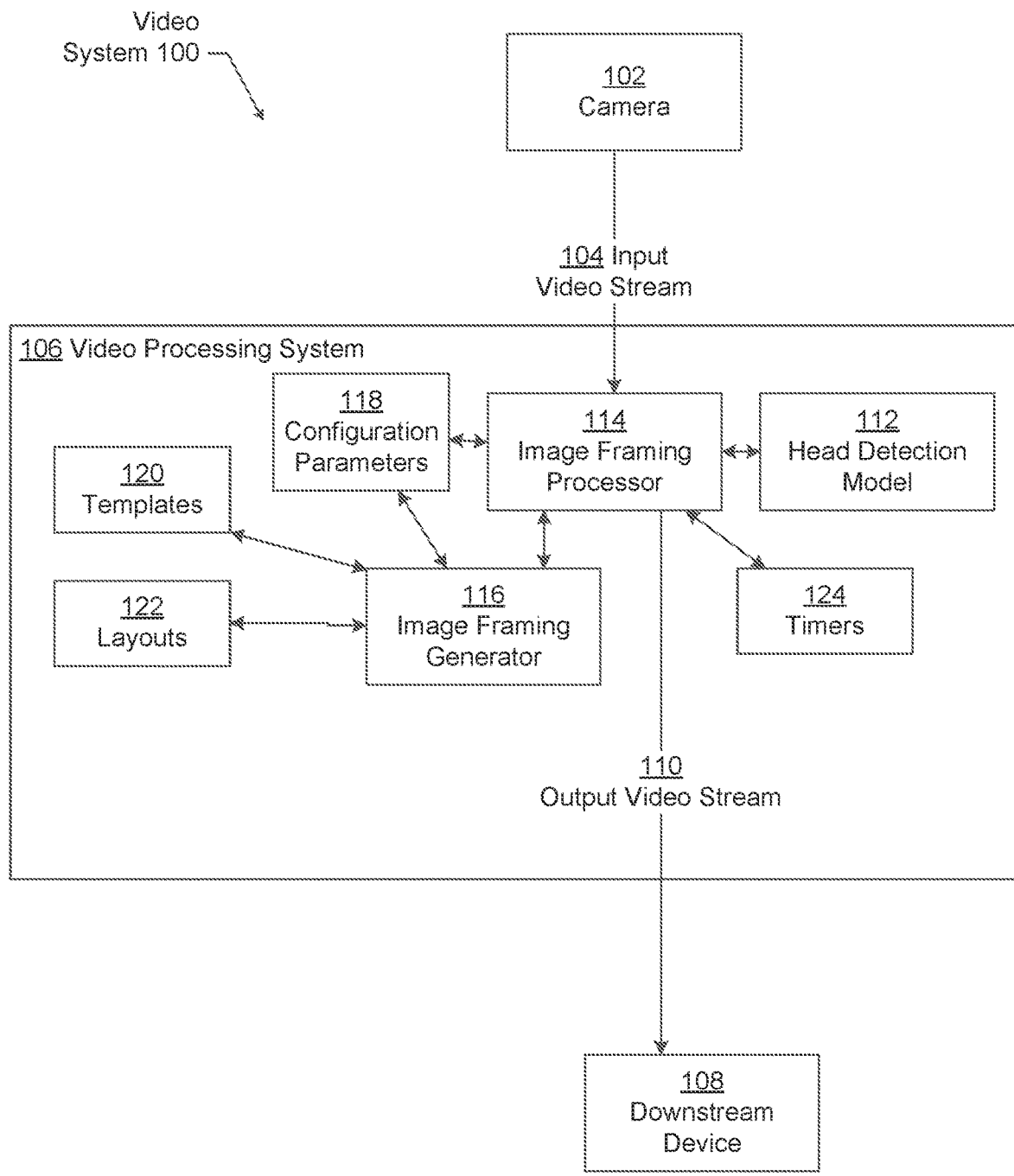
FIG. 1 shows a diagram of a system in accordance with one or more embodiments.
Figure 3:
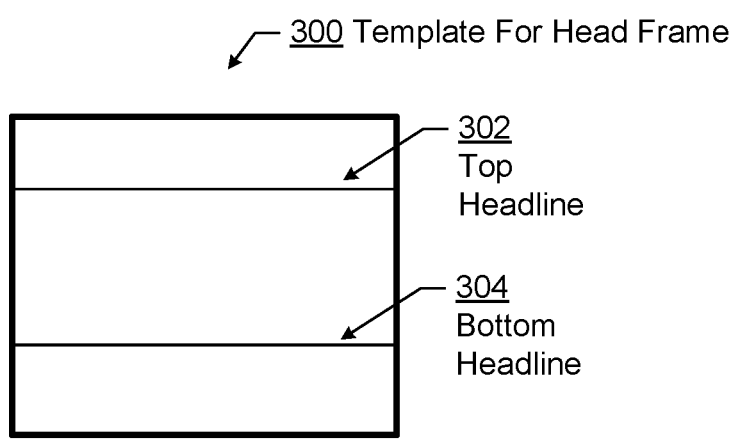
FIG. 3 shows a diagram of a template in accordance with one or more embodiments.

FIG. 1 is a diagram of a video system (100) in accordance with one or more embodiments. As shown in FIG. 1, the video system (100) may include a camera (102) connected to a video processor (106). The camera (102) may correspond to any type of camera that captures an input video stream (104), such as a webcam, a conference endpoint camera (e.g., as shown in FIG. 3), a standalone camera, or any other type of camera.

The camera (102) is communicatively connected to a video processor (106). The video processor (106) includes hardware or software that is configured to process the input video stream (104) and produce the output video stream (110). For example, the video processor (106) may be a computing system or an application in memory or on a non-transitory computer readable medium, such as described in FIG. 4. As another example, the video processor (106) may be a hardware processor, associated memory, and firmware integrated into the housing of the camera (102). As another example, the video processor (106) may be a conference system server or a component thereof that is an intermediary between the conference endpoints. As another example, the video processor (106) may be a video editing application. Other types of video processors may be used without departing from the scope of the disclosure.

Continuing with FIG. 1, the input video stream (104) is a video stream that is input into the video processor. The use of the term "video stream" corresponds to a standard definition used in the art. Namely, the video stream includes a sequence of images ordered in time from a continual video capture by the camera (102). If multiple cameras are present, the multiple cameras may create a single video stream that includes, for example, additional information such as depth. The video stream may include audio and other information. For nomenclature purposes, the input video stream is a sequence of input images, and the output video stream has a sequence of output images.

The output video stream (110) is a video stream that is output produced by the video processor (106). The images in the video stream include output frames. An output frame may focus the view in the camera on a single individuals (i.e., head frames), group of individuals (i.e., group frame), or subgroup of individuals based on proximity (i.e., proximity frame). A group frame is a framing technique in which a single output image shows the group of the individuals in the conference room as a contiguous image. When group framing is performed, the sequence of images is each a group frame. The group frame may include all participants (i.e., group members or members of the group) as a single unbroken image regardless of proximity to each other. For other types of framing such as head framing and proximity framing, a single output image may include multiple frames, where each of the multiple frames is a sub-image that corresponds to a single portion of the video stream captured by the camera.

In the output video stream, an output image may be a composite of the frames that form the output image to form a single image. In such a scenario, from the downstream device perspective, the output image of the output video stream appears as a single image within the video stream. As another example, the frames of an output image may be encoded and transmitted as separate images to be combined by the downstream device (108). In such a scenario, the positioning of the frames within the output image may be specified as metadata with the separate images.

The video processor (106) may include additional components for other type of processing. For example, the additional processing may include filtering, various detection operations, and other operations. The additional processing may be performed as a preprocessing, at the same time, or in parallel with the processing described in the present application.

The video processor is communicatively interposed between the camera (102) and the downstream device (108). The downstream device (108) may be a storage device, a conference endpoint, a conferencing system server that is an intermediary between two or more conferencing endpoints, a computing system, or other device that receives the output video stream (110).

Returning to the video processor (106), the video processor (106) includes a head detection model (112), an image framing processor (114), a frame generator (116), templates (120), timers (124), and configuration parameters (118). Each of these components is described below.

The head detection model (112) is a machine learning model that is trained to detect heads in an image of the input video stream (104). The head detection model (112) may be, for example, a convolutional neural network that operates on an image (e.g., an image extracted from the input video stream (104)). The head detection model (112) may use information from sub-sequence of images in the input video stream (104). The output of the head detection model (112) includes the locations of the heads of people in the image. For example, the locations may be denoted by bounding boxes around the heads of people in an image. Although a head detection model is described, a face detection model or a person detection model may be used without departing from the scope of the technology.

The image framing processor (114) is connected to the head detection model (112). The image framing processor (114) uses the location of the head detection model to determine whether an initial framing or re-framing should be performed. An initial framing may be performed based on configuration parameters (118) or the output of the head detection model. Reframing may be performed based on configuration parameters (118), the number of people detected in a room as output by the head detection model (112), movement of people (e.g., within the frames or into or out of the frames or conference room), and timers (124).

The timers (124) may be hardware or software timers that are each configured to trigger an event when a certain amount of time has elapsed. The timers (124) are frame timers specifying when to reframe. The initiation of the timers is triggered by the detection of an event by the image framing processor (114). Different timers may have corresponding different event types. A first timer may correspond to a detection of a person leaving a head frame and staying within the room. For example, the person may be detected in images of the input video stream as being outside the head frame. A second timer may correspond to a detection of a person leaving the head frame and the room. For example, the person may no longer be detected in images of the input video stream. A third timer may correspond to a detection of a person entering the room. A fourth timer may correspond to the detection of the person being off-center of the head frame. Off-center means that the person's head is no longer in the location for the head as specified as corresponding to the template. If the image framing processor (114) determines to perform reframing, the image framing processor (114) may trigger the frame generator (116). If the image framing processor (114) determines that an initial framing or reframing should not be performed, then the image framing processor (114) may use the prior output (e.g., the head frame definitions and image frame definitions) of the frame generator (116) to generate the output images in the output video stream (110). In some cases, the reframing may be a complete reframing, by determining a layout and generating new head frame definitions for each of the heads. In other cases, such as in the case of the head being detected off-center, the reframing is only on the corresponding head frame definition.

The frame generator (116) uses, as input, an input image and locations of people specified by the head detection model (112). The frame generator (116) generates an image frame definition and a head frame definition as output. The head frame definition defines the boundaries of each frame within the input image and zoom level for each frame. In particular, for a head, the head frame definition specifies the sub-image of the input image that forms the frame as well as the zoom level for the sub-image. Thus, the head frame definition may be a bounding box for each frame, a zoom level, and the position.

The image frame definition identifies each of the head frame definitions and assignments of the head frame definitions to locations in the image frame. Specifically, the image frame definition identifies, for each particular head frame definition, the particular position to place the head frames corresponding to the head frame definition.

Figure 2:
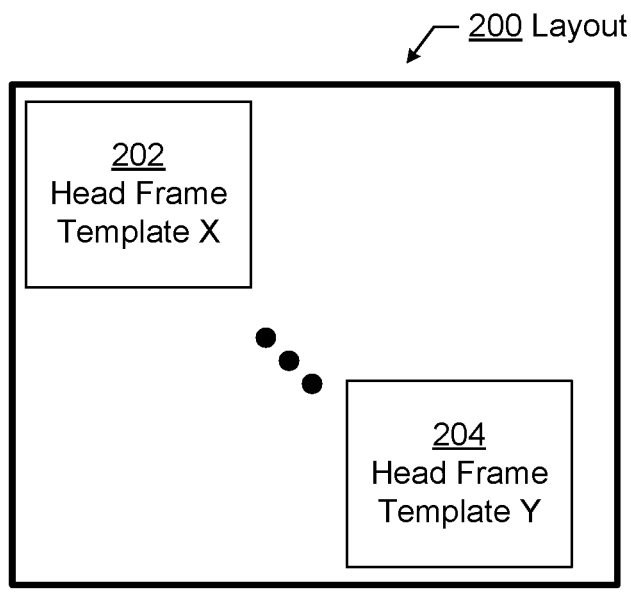
FIG. 2 shows a layout in accordance with one or more embodiments.

The frame generator (116) may include image frame layouts (122) and sets of templates (120). In one or more embodiments, the image frame layouts (i.e., layout) defines how head frames fit into the dimensions of an image of the video stream that is transmitted. For example, if the dimension of the image is 16:9, then the image frame layout specifies a 16:9 region. Other dimensions may be used. FIG. 2 shows a conceptual diagram of a layout (200). Turning briefly to FIG. 2, a layout (200) specifies different layouts of head frames as defined by the corresponding head frame templates (e.g., head frame template X (202), head frame template Y (204)) in an output image. Specifically, the layout (200) specifies the set of head frame templates (described below) and the location of each head frame template in the set.

Returning to FIG. 1, the video processor (106) may have multiple layouts, whereby each layout corresponds to a number of heads and positions of heads within the image. The positions are the locations of the heads with respect to each other. Thus, a particular layout is specific to the number of heads and may optionally be specific to positions of heads in the image extracted from the input stream. For example, if six heads are detected in the image, then the corresponding layout specifies positions for six head frames. If five heads are detected in the image, then the layout specifies positions for five head frames. In some embodiments, the five head frames include four head frames located in two columns of two rows and one head frame that is an entire column. The one head frame that is an entire column may be on the left side, right side, or middle of the columns of two head frames based on the location of the people in the room. For example, if one person is sitting alone in the middle, then that person is in a single column head frame in the middle. Similarly, if the arrangement is one person on the left and two people in the center, and two people on the right, then the column head frame may be on the left. A similar result occurs when the single person is on the right. Thus, the layouts may also be based on the position of the heads detected in the image with respect to each other head.

The templates are head frame templates (120). A head frame template describes the dimensions of the head frame and the positioning of the head within the head frame. Specifically, the head frame template defines how a sub-image of the original image is to fit within a frame. FIG. 3 shows a schematic diagram of a head frame template (300). The dimensions of each template may differ depending on the template. Similarly, the locations of the alignment lines may differ. As shown in FIG. 3, a template (300) includes a top headline (302) and a bottom headline (304). The top headline (302) is defined to align with the top buffer of a head buffer bounding box. Similarly, the bottom headline (304) is defined to align with the bottom buffer of the head buffer bounding box. Other guiding lines may be used to align the head of a person within the frame. For example, a center crossing line may be used, side lines, or other types of lines.

Although FIG. 1 presents the image framing processor (114) and the framing generator (116) as separate components, the image framing processor (114) and frame generator (116) may be combined into a single component that operates as a single unit. Further, the template (120) may be part of the frame generator (116).

Figure 4:
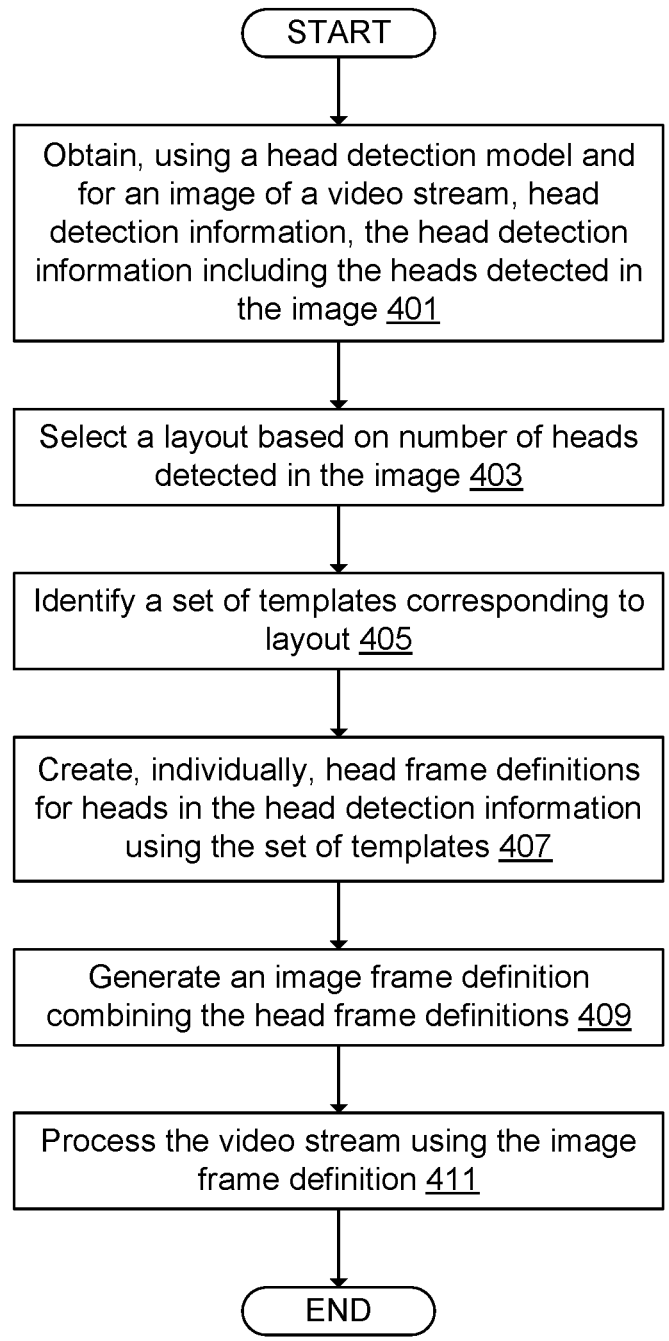
FIGS. 4, 5, and 6 show a flowchart in accordance with one or more embodiments.

FIG. 4 is a flowchart in accordance with embodiments of the disclosure. In Block 401, using a head detection model and for an image of a video stream, head detection information is obtained. The image framing processor passes an image frame to the head detection model. The head detection model is a convolutional neural network that processes the image features of the image to detect the locations of the heads in the image. The output of the head detection model is passed to the frame generator.

In Block 403, a layout is selected based on the number of heads detected in the image. The head detection information identifies each head of the image and the location of each head. By counting the heads, the number of heads is determined. From the number of heads, the layout is selected. The layout is selected so that a position exists in the image frame for each head of the image. The layout may also be based on the position of the heads in the image as described above. Specifically, the layout may assign heads that are farther from other heads into a column space.

In Block 405, the set of templates corresponding to the layout is selected. The selected set of templates are the templates as specified by the layout.

In Block 407, individually, the head frame definitions are created for heads in the head detection information using the set of templates. The heads are matched to templates specified in the layout. Serially or in parallel with each other for the heads, the head frame definition is generated for the head using the template. The location of the head within the image is aligned to the template. Zooming and cropping may be performed so that the head matches the alignment lines specified by the template. The result is a head frame definition that defines the zoom amount and the location within the image (e.g., bounding box for the head frame with zoom amount). The heads may have heterogenous zoom amounts. Specifically, head frame definitions for heads farther from the camera may have an increased zoom amount as compared to head frame definitions for heads closer to the camera. For each head, a head frame definition is created. Because, in some embodiments, head frame definitions are created individually from the image and consider the whole image rather than partitions thereof, the head frame definitions may be overlapping.

In Block 409, an image frame definition is generated group frame definition is created based on the orientation. The head frame definitions are assigned to the image frame definitions based on the assignment. The result is an image frame definition that has multiple locations, each location identifying a head frame definition to use to populate the image frame definition.

In Block 411, the video stream is processed using the image frame definition. For each image of the video stream, the portions of the image are selected and zoomed as defined by the corresponding head frame definitions to create head frames. The head frames are placed in an image frame in the locations defined by the image frame definition. The image frame is then transmitted to the downstream device. The image framing processor continues to process the images to generate image frames. Each image of the video stream is adjusted as defined by the image frame definition to present the heads. During video conferencing (e.g., an active conference call between endpoints), the video stream for the participants in the conference room is adjusted in real time to create an output stream having head frames. The video processor monitors the head frames and the image to determine whether reframing should be performed as described above. Thus, the heads are reframed as people move in and around the room or people enter or leave the room.

Although FIG. 4 describes generating an image frame, the individual head frames may be generated. For example, a set of templates may be selected based on the number of heads, an intermediary conferencing device may individually present the heads. In such a scenario, both people in a conference room and people who are in their own rooms may have equal portions of the screen in a conference call. In another case, the head frames may be transmitted individually to the downstream device that combines the head frames into the image frame.

Figure 5:
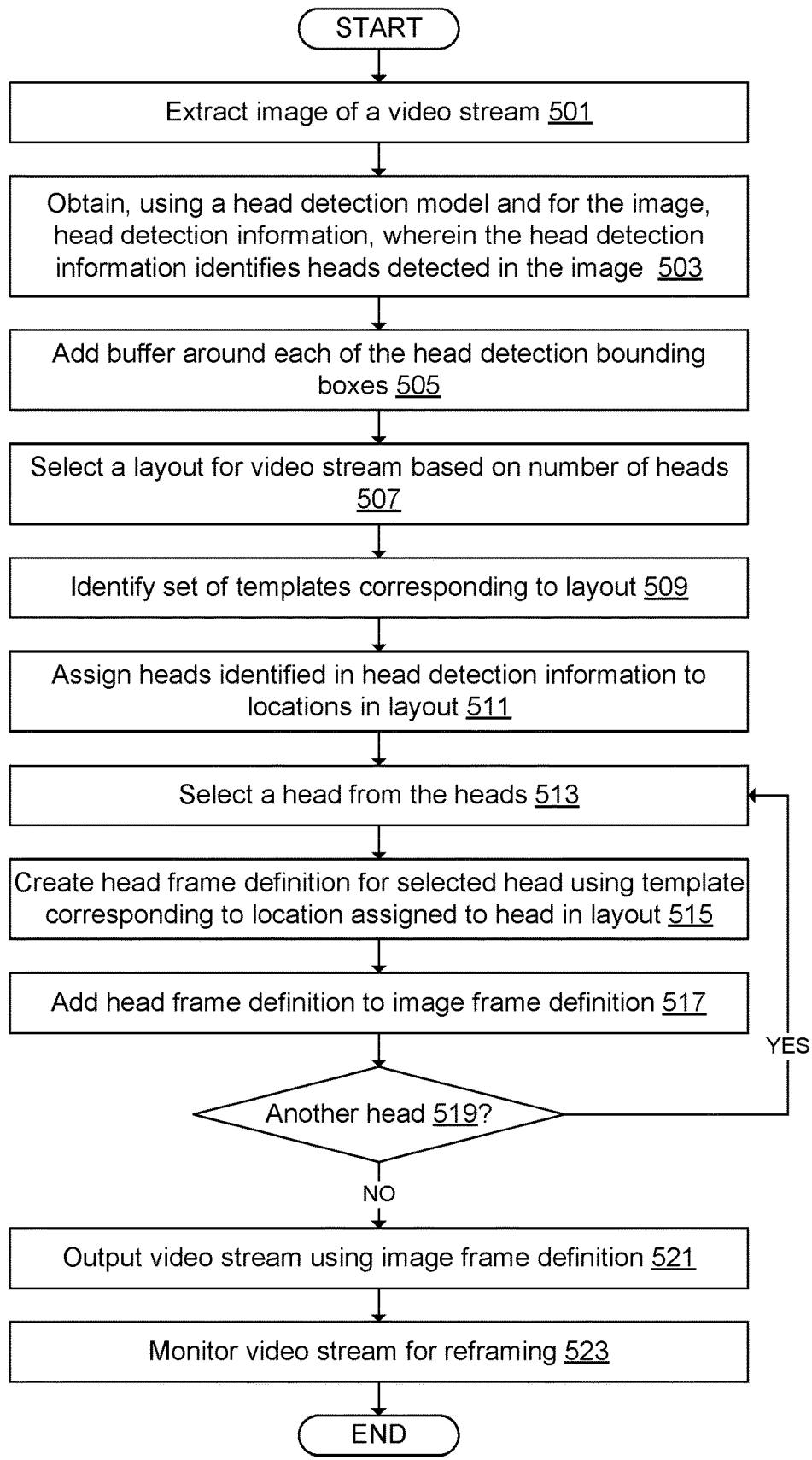

FIG. 5 shows a method of performing image framing that is more detailed than FIG. 4. Other techniques besides those describe in FIG. 5 may be used without departing from the scope of the technology. Further, in some implementations, some of the operations of FIG. 5 may be omitted or modified. In Block 501, an image of a video stream is extracted. The camera captures the video stream in real time and passes the video stream to the video processor. The video processor processes the video stream before sending the video stream to the downstream device. In the video processor, the image frame processor extracts an image from the video stream for processing. In some embodiments, the extracting of the image is a sampling of the video stream performed at a predefined interval, such as at a defined number of microseconds. Thus, at each elapse of the predefined interval, the image frame processor extracts an image for separate processing and continues to perform framing of the video stream according to the current configuration. The framing is performed by the image frame processor cropping and zooming into different parts of each image of the video stream according to the current configuration. Initially, the cropping and zooming is a default configuration. However, when a frame definition (e.g., head frame definition) is generated from the frame generator, the frame definition is applied by the image framing processor to the stream. Because a live conference call is occurring, the processing is performed quickly so as to be applicable to the current configuration of the participants being displayed. Thus, the processing described in FIG. 5 is performed in real-time to create new head frame definitions.

In FIG. 5, the image that is extracted shows heads of members of the conference (i.e., participants or people in the conference). However, the video processor has not yet detected that the image shows the heads or the configuration of the participants.

In Block 503, head detection bounding boxes are obtained for the image of the video stream. The head detection information identifies the heads detected in the image. The image frame processor transmits the image to the head detection model that is a convolutional neural network. The convolutional neural network processes the pixel values of the image through several layers to classify different parts of the image as corresponding to heads. The head detection model then outputs bounding boxes around the heads of the image. For example, the bounding boxes may be a starting coordinate, a length and a width or opposite corners of each bounding box.

The head detection bounding boxes are passed to the frame generator. In Block 505, the frame generator adds a buffer around each of the head detection bounding boxes. The buffer accommodates that the head detection bounding box may be too close to the head and miss ears, chins, and other close extremities of the head. Thus, the buffer may increase the height and width evenly by fifty percent. In other words, the result is a box that is twice the height and width of the bounding box.

In Block 507, the frame generator selects a layout for the video stream based on the number of heads. The frame generator determines the number of heads in the image. Then, the frame generator selects a layout that has the number of templates matching the number of heads. If multiple layouts match, then the layout may be further defined based on the positioning of heads within the image. For example, pairwise distances between centers of head bounding boxes are determined. Heads that are close together may be identified as such and have corresponding head frame definitions vertically or horizontally adjacent. In such a scenario, the layout is selected based on matching distances between heads.

In Block 509, the set of templates is identified based on the layout. As discussed above, the layout identifies which templates are in the set according to template identifiers of the templates. Thus, using the template identifiers, the set of templates is determined. Further, the layout specifies the location of the template within the layout. Thus, each template has a corresponding location in the layout.

In Block 511, heads identified in the head detection information is assigned to the locations in the layout. In one or more embodiments, the assignment groups heads that are close together close in the layout. Heads in the image are selected in order from left to right. The heads are then assigned in the order to the locations in the layout from top to bottom and left to right. Other assignments of heads to locations may be used.

In Block 513, a head is selected from the set of heads. For the selected head, a head frame definition is created using the template corresponding to the location assigned to the head in the layout in Block 515. Creating the head frame definition for a head is described in FIG. 6.

Figure 6:
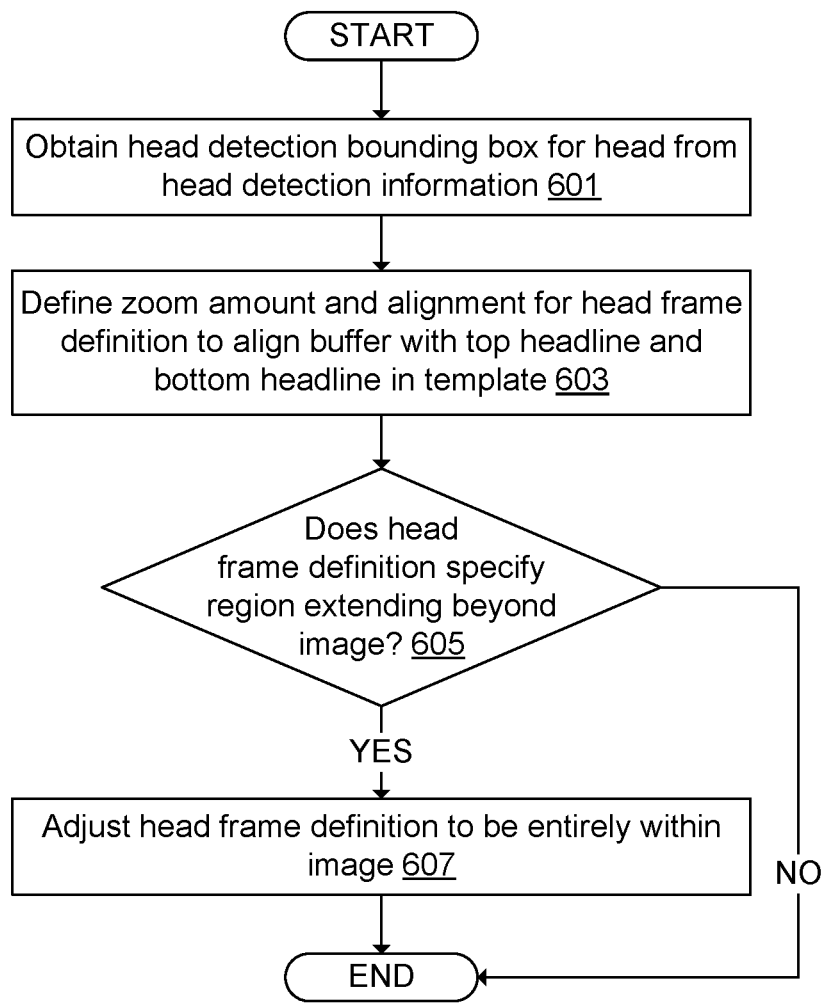

Turning briefly to FIG. 6, in Block 601, a head detection bounding box is obtained for the head from the head detection information. As discussed above, the buffer around the head detection bounding box is determined. The zoom amount and the alignment for the head frame definition is defined to align the buffer with the top headline and the bottom headline in the template in Block 603. The head is horizontally centered in the template. The head is vertically aligned, and the zoom amount is defined such that the top buffer aligns with the top headline and the bottom buffer aligns with the bottom headline. The location of the area inside of the template after the zooming and alignment is defined and added to the head frame definition.

In Block 605, a determination is made whether the head frame definition specifies a region extending beyond the image. Specifically, the determination is whether the head frame definition creates a head frame that extends beyond the boundary of the image. If not, the flow proceeds to end. If so, the flow proceeds to block 607.

In Block 607, the head frame definition is adjusted to be entirely within the image. The adjustment may be performed as follows. A first adjustment shifts the alignment between the template and the head such that the head does not align with the alignment lines of the template but is still within the head frame. Thus, the location referenced by the head frame definition is changed by the shift amount. If the shifting is insufficient, then additional zooming may be performed until the head frame includes a region entirely within the image. The result is a revised zoom amount that increases the zoom from the current zoom specified by the template. The head frame definition is then updated with the revised location and zoom amount.

Returning to FIG. 5, the head frame definition is added to the image frame definition in Block 517. The head frame definition is added at the position defined by the image frame definition. In Block 519, a determination is made whether another head exists. If another head exists that is not processed, then the next head is processed starting with Block 513.

Once a head frame definition is created for the heads in the image and added to the image frame definition, the flow proceeds to Block 521. In Block 521, the video stream is outputted using image frame definition. The image frame definition is passed to the image framing processor that adjusts the images according to the image frame definition and sends the images to the downstream device.

In Block 523, the image framing processor monitors the video stream for refreshing. Specifically, the image framing processor continues to extract images from the video stream to detect events in the video stream. For example, if the event is that a head moved outside of the alignment lines of the head frame definition, then a corresponding timer for the movement of the member is initiated responsive to the detection. The amount of the corresponding timer is set such to account for the fact that the head may immediately return and to avoid flickering of the image. If the head does not return within the elapse of the time, a reframing of the head frame definition is triggered responsive to not detecting the head in the corresponding head frame at an elapse of a threshold amount of time according to the timer.

As another example, the event may be that a head is no longer detected in the head frame. A corresponding timer is then triggered. If the head is not later detected at the elapse of the timer, then a reframing is triggered responsive to the head remaining outside of the timer.

As another example, the detection may be that a person leaves the room, or a new person enters the room. Namely, the person may be out of the area captured by the image, or a new person may be in the area. A corresponding timer is initiated. If the person does not return or the new person does not leave, then a reframing is triggered responsive to not detecting the person in the room or detecting the new person at an elapse of a threshold amount of time according to the timer. The reframing is a reframing of the entire image rather than only a head frame.

FIGS. 7-21 show an example in accordance with one or more embodiments. FIGS. 7-21 show examples of head framing In the example, although specific numbers are used, the numbers are only for example purposes. All numbers should be considered changeable and configurable without departing from the scope of the technology. Additionally, even though measurements may be described as absolute (e.g., number of pixels) or relative (e.g., percentages of another measurement), the various measurements are not intended to be so limited. For example, measurements defined in percentage terms in the example may be defined in absolute terms while measurements defined in absolute terms may be defined in percentage terms.

Head framing is the framing happening in a conference room. The goal is to get meeting equity in a hybrid meeting. The meeting equity is for the people attending in the room. In one or more embodiments, the head framing creates meeting equity by making each person in the conference room have a same head size in the head frame.

Figure 7:
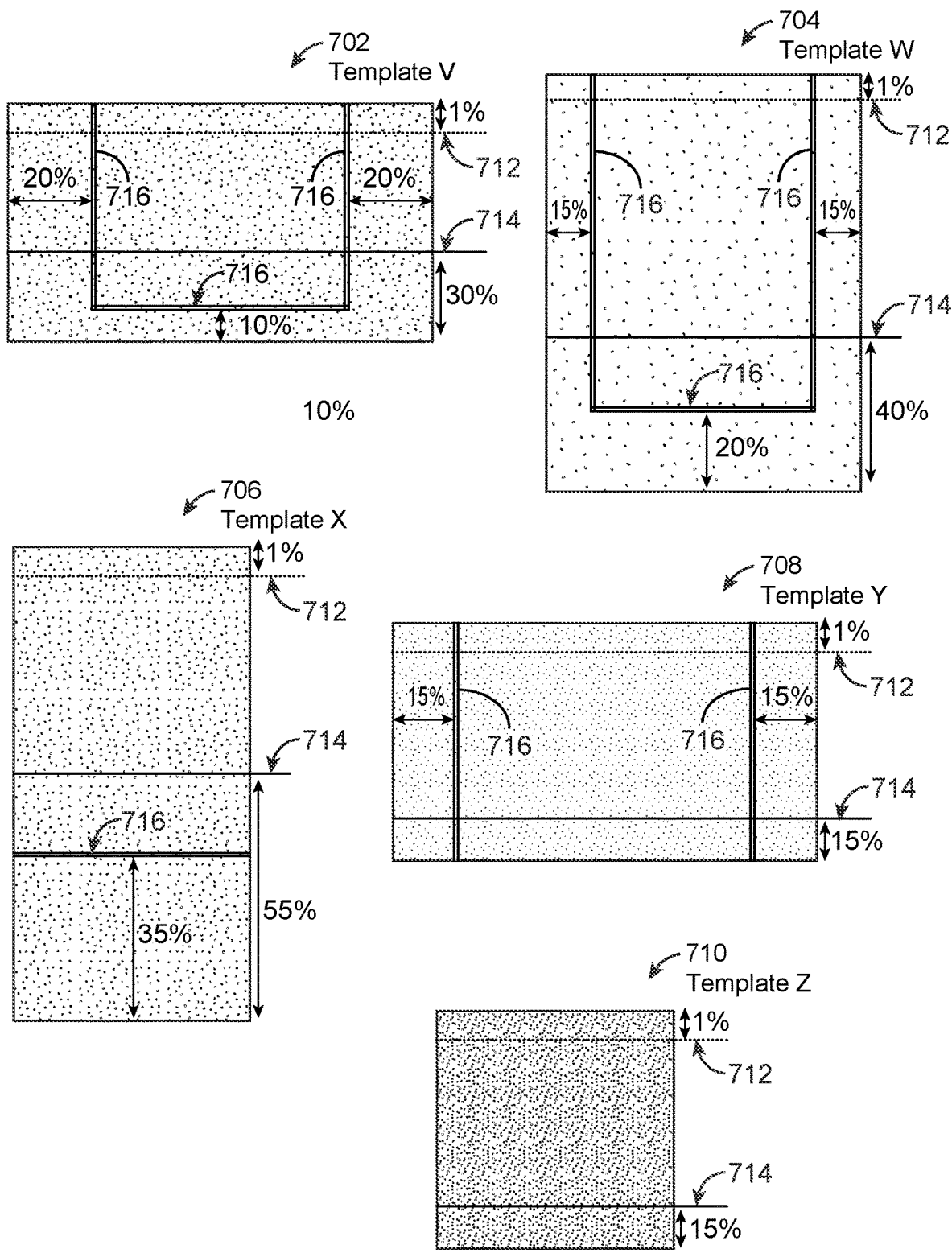
FIG. 7 show an example set of templates in accordance with one or more embodiments.

For example, FIG. 7 shows example templates that may be used for head framing. The templates may be mixed and matched to fill in an image frame based on the number of heads in the image. The lines in the templates are used to align the head buffer bound box described above within the frame. Each template corresponds to a type of frame. Thus, in the example shown in FIG. 7, the templates include template V (702), template W (704), template X (706), template Y (708), and template Z (710). Template V (702) is a single head frame template that may be used when a single person is in the conference room. Template W (704) is a merged column head frame template that may be used when two people are in the conference room. Template X (706) is a column head frame template that may be used when three or five people are in the conference room. Template Y (708) is a wide head frame template that may be used when four people are in the conference room. Template Z (710) is a square head frame template that may be used when five or six people are in the conference room. Although a maximum of six people is described, the templates and layouts may cover any number of individuals.

Each template includes a top headline (712) and a bottom headline (714). The top headline (712) in each template should align with the top of the head buffer bounding box that includes the head bounding box and the buffer region. The bottom headline (714) in each template should align with the bottom of the head buffer bounding box that includes the head bounding box and the buffer. The bottom headline and top headline define the positioning and zoom amount of the head buffer bounding box within the head frame. As shown, the top headline is generally closer to the top of the template than the bottom headline is to the bottom. The purpose is to show more of the participants body rather than unused area above the person's head. However, the location of the top and bottom headlines may be adjusted.

The templates may also include off center triggers (716). The off center triggers (716) are the lines that trigger a reframing based on the head bounding box moving out of the region between the off center trigger lines. Specifically, when a head touches or moves out of the region defined by the off center triggers and potentially the top and bottom headlines, the head reframing is triggered at lease for that head.

Figure 8:
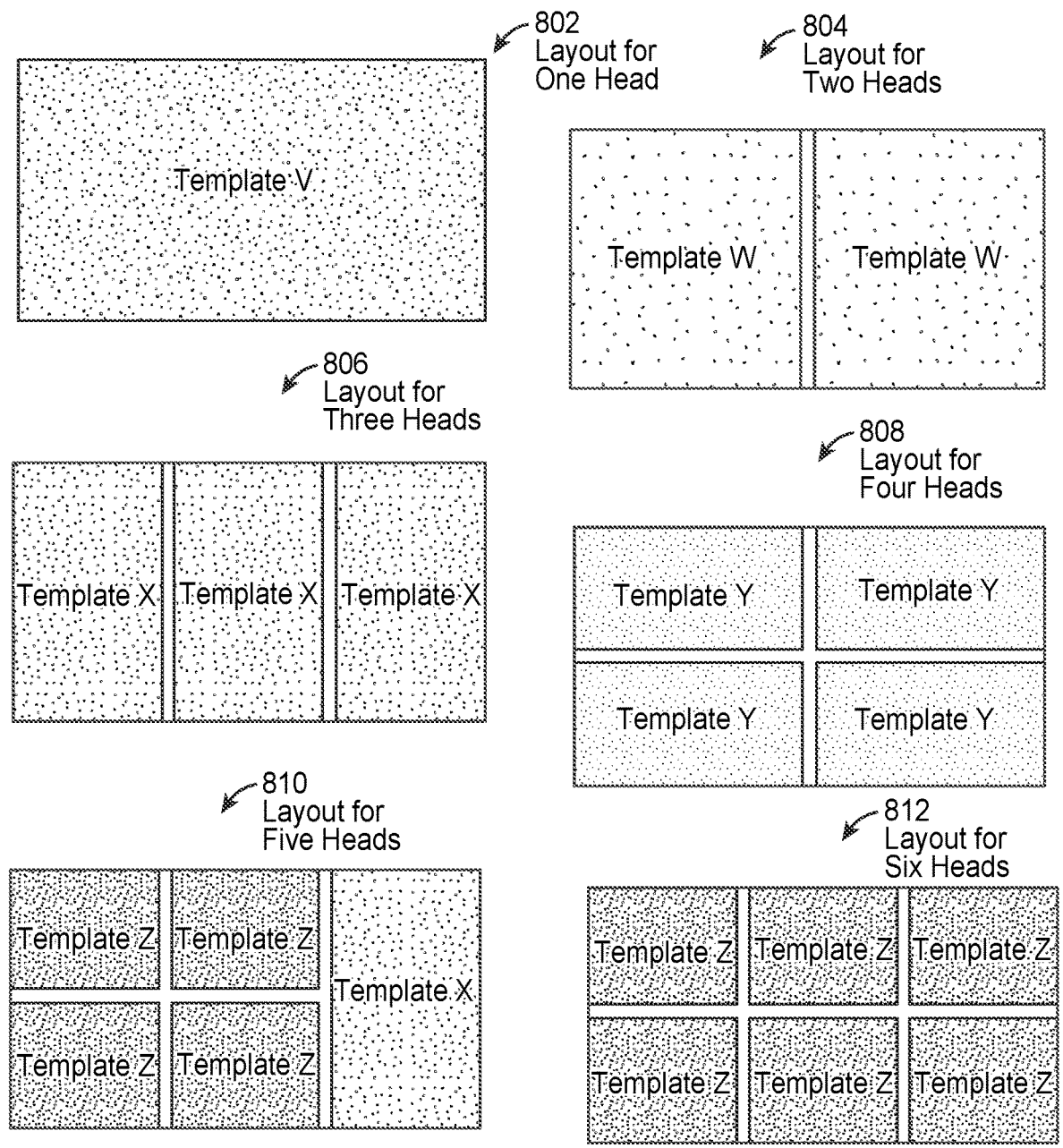
FIG. 8 shows an example set of layouts in accordance with one or more embodiments.

FIG. 8 shows example layouts that use the templates shown in FIG. 7. FIG. 8 shows an example of layouts for one head (802), two heads (804), three heads (806), four heads (808), five heads (810), and six heads (812). The templates in the layouts are the templates shown in FIG. 7. As shown by a comparison of FIGS. 7 and 8, the head size is the same for the templates that share a layout. For example, template Z and template X are both in the five person layout. Thus, the distance between the top headline and the bottom headline is at least approximately the same for both template X (706) and template Z (710) as shown in FIG. 7. The extra room for the column head frame of template X (706) is for a person's body to keep the meeting equity. Returning to FIG. 8, the layouts specify the location of the frames within the output image. Layouts may include a mixture of templates of different frame types. For example, for five people, the layout includes four square head frame templates and one column head frame template. Other layouts may also be used.

Figure 9:
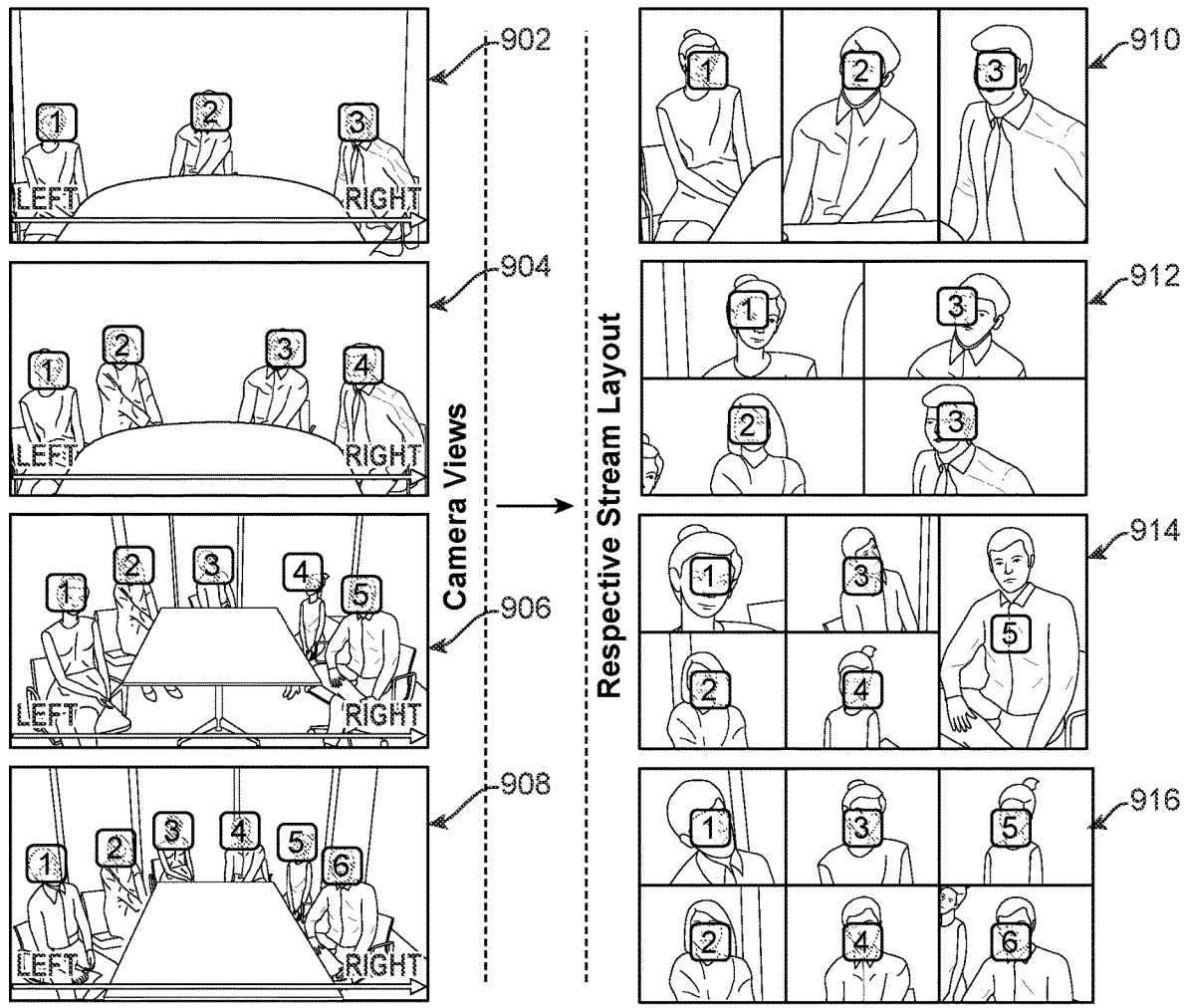

FIG. 9 shows different examples of assigning heads to head frames. Specifically, FIG. 9 shows images of the video stream (902, 904, 906, 908) each next to a corresponding image frame (910, 912, 914, 916). The numbers in the boxes over the heads match the numbers of the assignment in the corresponding head frame of the respective image frames. As shown in FIG. 9, one method of performing the assignment is to scan the heads of people from left to right. The video processing system then assigns the heads in that order (i.e., the scanned order) to head frames in the input image from left to right and top to bottom. Thus, adjacent people in the conference room may be stacked in the layout of the output image as shown.

Other assignments may be used without departing from the scope of the technology. For example, arrange may be based on the depth of the room or to first fill in the top row of the layout and then fill in the bottom row of the layout.

Figure 10:
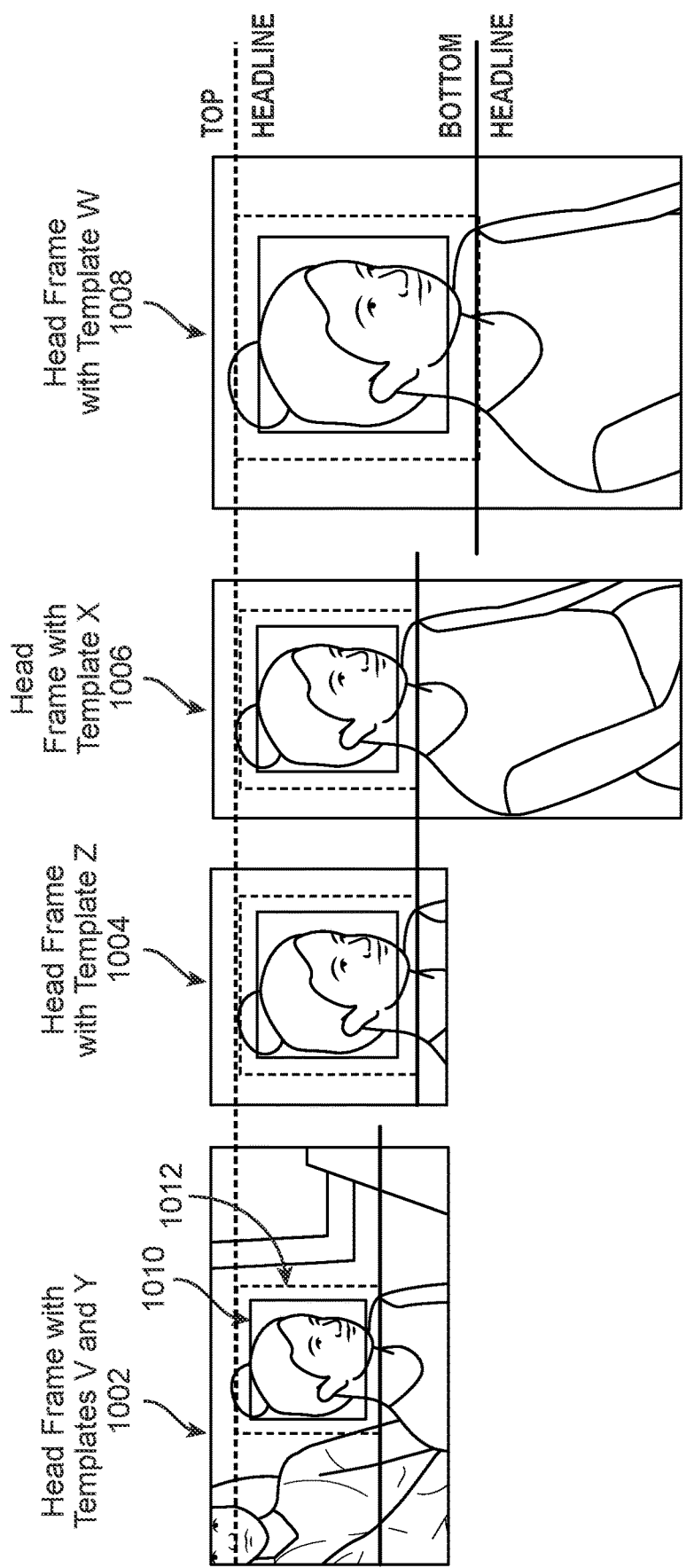

FIG. 10 shows an example of how a same head may be aligned into different templates. The head bounding box (1010) is the inner box. The head buffer bounding box (1012) is the outer box. The head detection model identifies the heads of individual people in the conference room. The head detection model outputs a head bounding box (1010) for each detected head. A head buffer (1012) around the head bounding box is added. The head buffer is defined so as to include a person's full head. In the example, the head buffer increases the head bounding box by 50%. The increased region that includes the head bounding box with the head buffer is referred to as head buffer bounding box and is the region of the box (1012).

Continuing with FIG. 10, the head frames with templates V and Y (1002), template Z (1004), template X (1006), and template W (1008) from FIG. 7 are shown. As shown in FIG. 10, the head buffer bounding box is aligned with the top headline and bottom headline of each template. To perform the alignment a zoom level may be applied to the sub-image having the head. Further, portions of the input image with the zoom level applied is included to fill in the rest of the frame as defined by the template. Thus, as shown in FIG. 10, applying templates V and Y may cause more background to be included in the head frame than template Z. The guiding lines in FIG. 10 are for explanatory purposes and do not denote actual lines in the head frame.

Figure 11:
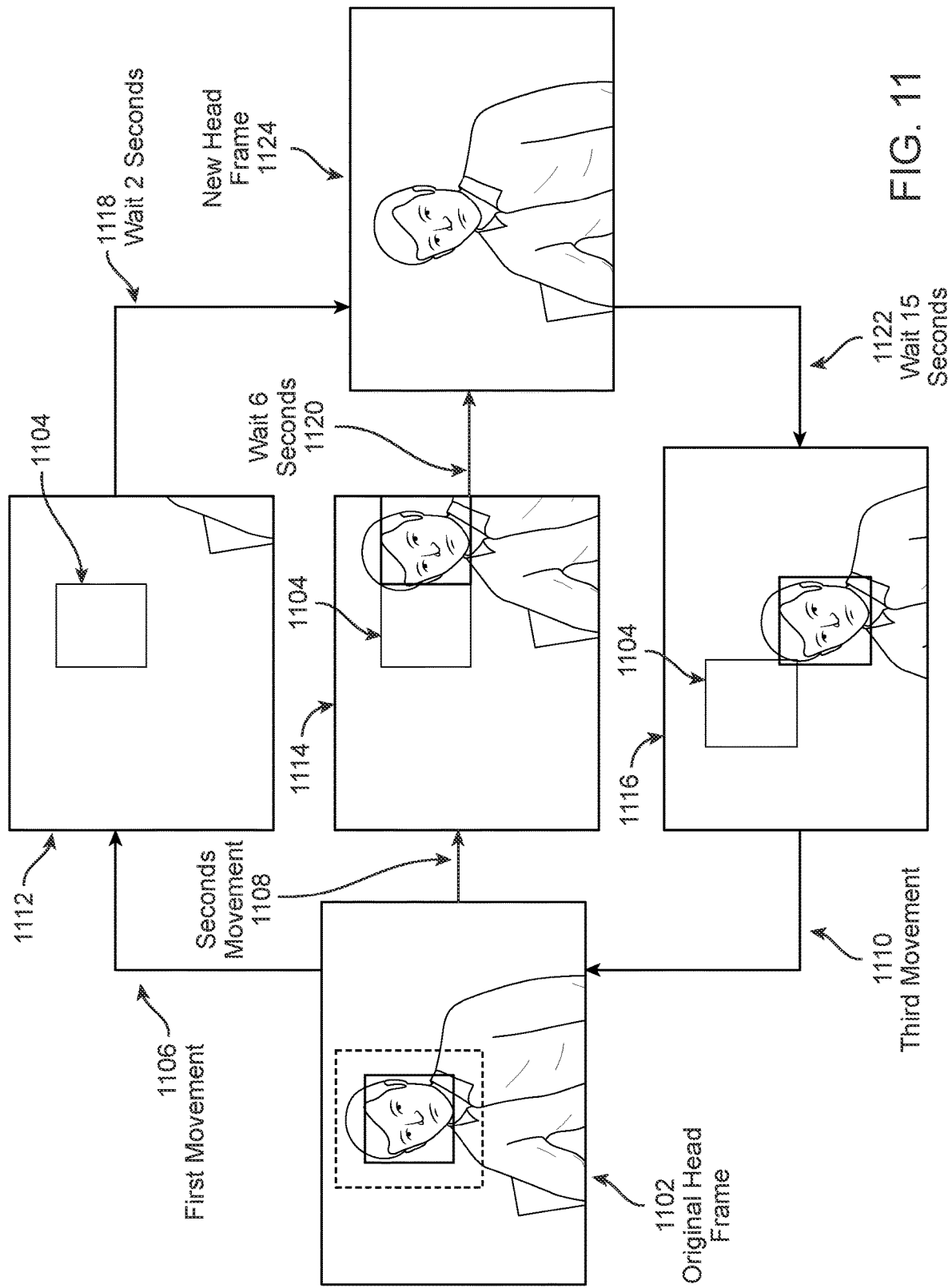

FIG. 11 shows different head movements that may cause reframing Head frame (1102) shows the original head frame. In the example, the box (1104) shows the location of the head buffer bounding box in the original head frame overlaid onto the other frames. In a first movement (1106), a person moves out of the head frame (1112) completely. In such a scenario, the system may wait a first threshold amount of time (e.g., 2 seconds (1118)) and then cut to the new location using reframing to create new head frame (1124).

Returning to the original head frame (1102), the person in a second movement (1108) moves to be on the edge of the head frame (1114). In such a scenario, the system may wait a second threshold amount of time (e.g., 6 seconds (1120)) and then cut to the new location and zoom level using reframing to create the new head frame (1124).

Returning to the original head frame (1102), the person in a third movement (1110) moves only within the head frame (1116). In such a scenario, the system may wait a third and longer threshold amount of time (e.g., 15 seconds (1122)) and then cut to the new location and zoom level using reframing to create the new head frame (1124).

In the case of the second movement (1108) and third movement (1110), the purpose of the reframing is to refocus the head frame on the person. In the first movement (1112), the purpose of the reframing is to reshow the person in case they do not quickly move back. The thresholds are set to avoid flickering in the case a person moves frequently while at the same time focusing on the person throughout the conference. The recapture the person such that the focus region of the head frame is no longer on the person. Thus, the threshold is set based on the degree of the movement.

Figure 12:
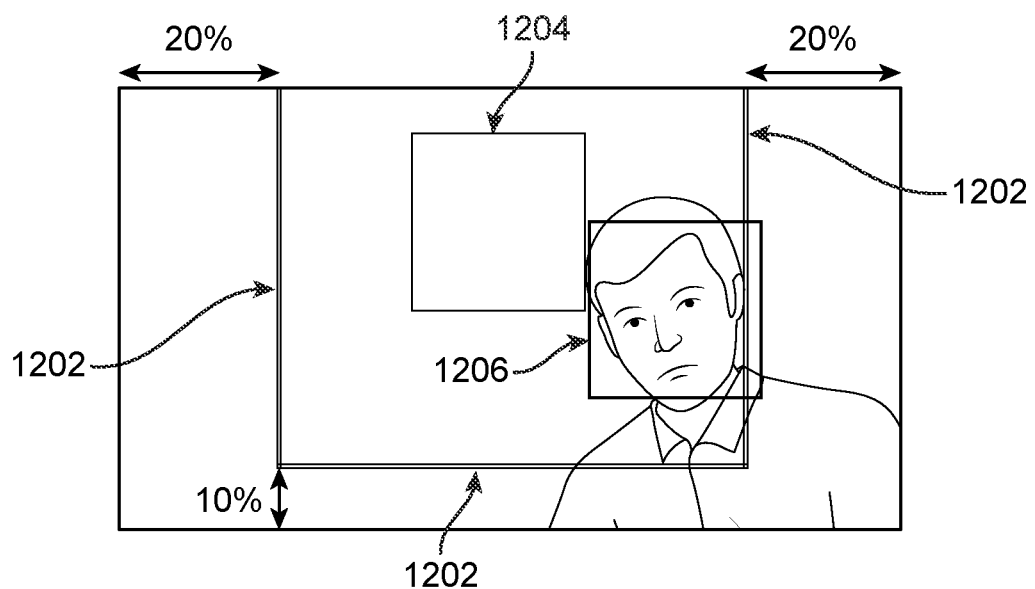

FIG. 12 shows how the off center lines (1202) trigger the reframing as described in FIG. 11. Box (1204) is not tracked and is only to show the original location of the head bounding box in the head frame. As shown in FIG. 12, if the head bounding box (1206) touches or overlaps with the off center line (1202), then the reframing timer starts to initiate reframing of the head frame. The off center line (1202) is used to trigger reframing in order to make a better composition of the person in the head frame. The other movements of a person described in FIG. 11, such as touching the edge of the frame and the out of the frame may be based on the boundaries of the head frame itself rather than the off center lines (1202).

Although FIG. 12 describes the head bounding box as touching or overlapping with the off center trigger lines, the head buffer bounding box may be used.

Figure 13:
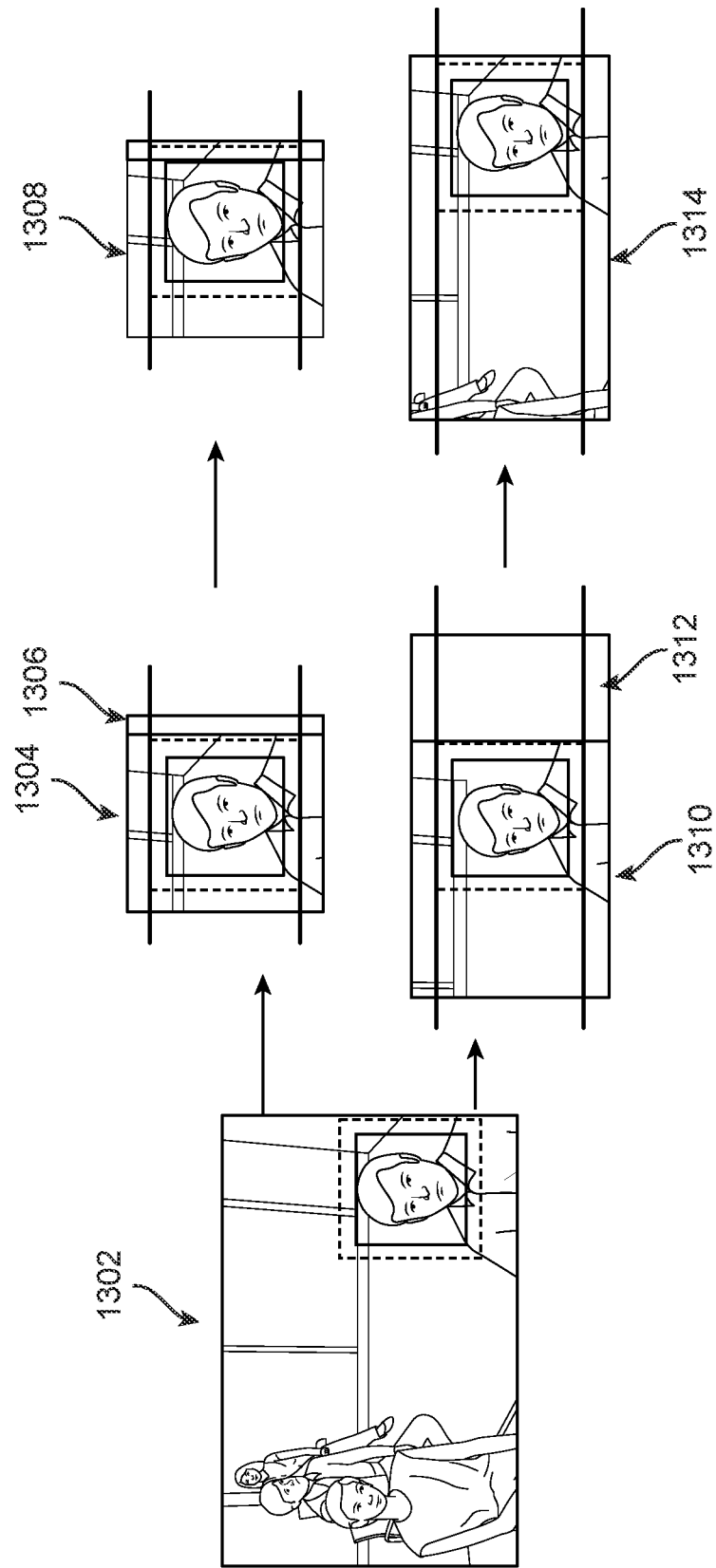

FIG. 13 shows an example of techniques to handle cases in which the initially generated head frame includes regions not in the image. The base rule is to apply the template as defined by the template. However, in some cases, applying the base rule causes the image to not fill the frame. For example, the camera view of the input image does not include a wide enough expanse.

In the example of FIG. 13, the image (1302) has the head of a person at a corner. Consider the scenario in which the template that is assigned is a square template. In the example, head frame (1304) results from applying the template. As shown, the head frame (1304) includes a region (1306) not captured in the image (1302). Thus, a first mitigation technique is applied. In the first mitigation technique, the camera view is shifted to fill the head frame. For example, the sub-image is shifted to include the person and the area to the left of the person. Thus, the head buffer bounding box may no longer align with the top and bottom headline or may not be centered in the frame. Head frame (1308) shows the result whereby the head is not horizontally centered. A similar operation may occur when the template is a wide template. In the example, head frame (1310) results from applying the wide template. As shown, the head frame (1310) includes a region (1312) not captured in the image (1302). Shifting creates head frame (1314) in which the head is no longer horizontally centered but is still in the image.

Figure 14:
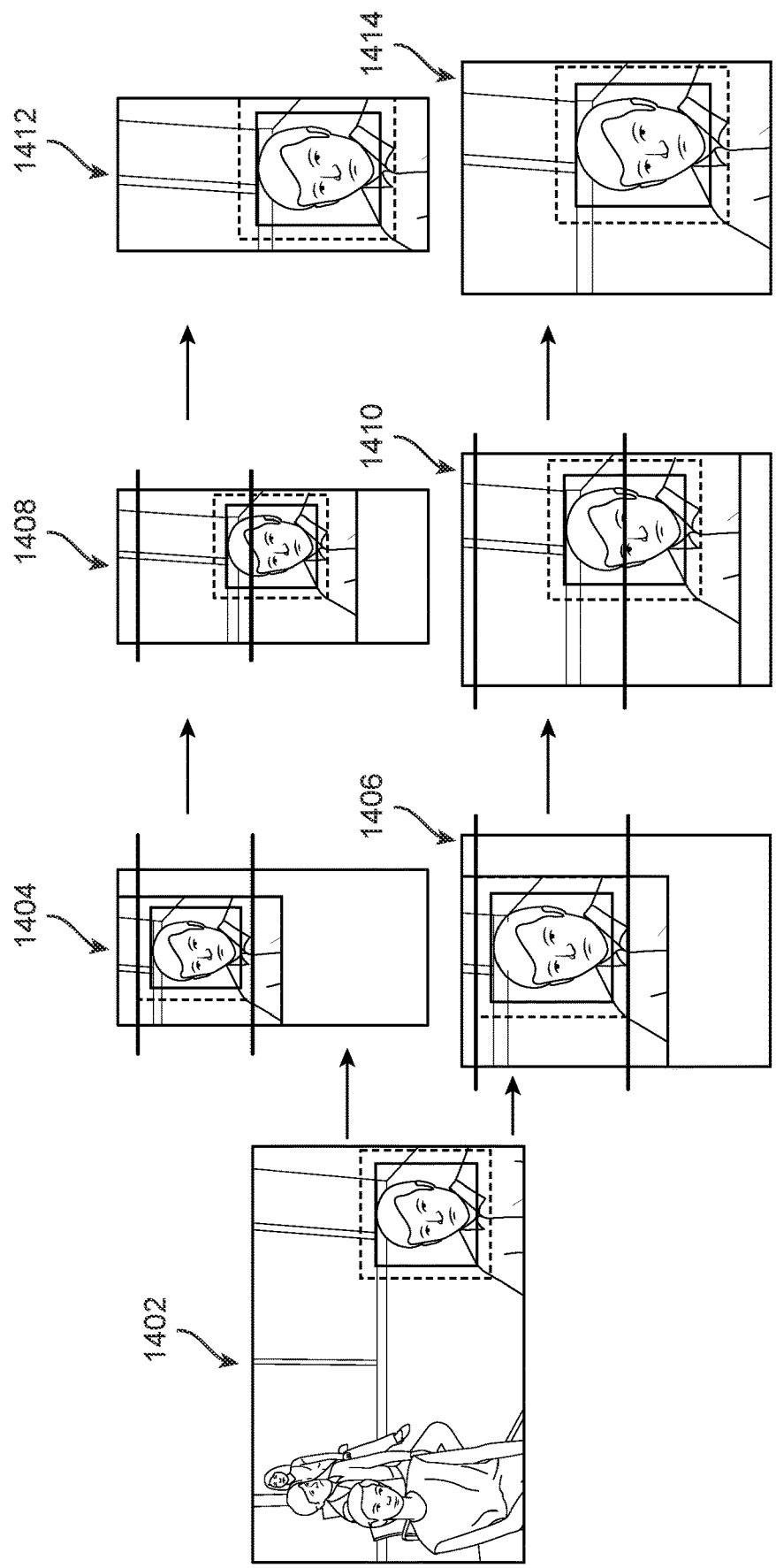

In some cases, applying a shift still fails to fill the frame. For example, as shown in FIG. 14, when a head is in the bottom right corner as shown in image (1402) and the template is a column or double column, the head frame (1404, 1406) may include regions not covered by the image. Further, as shown in head frames (1408, 1410, respectively), shifting both vertically and horizontally may be insufficient. For example, a gap may exist at the bottom of the head frame. In such as case, zooming is performed to increase the size of the head buffer bounding box to fill the frame as shown in new head frames (1412, 1414, respectively). In such a scenario, the head buffer bounding box may be bigger than the area defined by the top and bottom headline of the corresponding template. However, the region of image that is part of the head frame is fully within the image.

FIGS. 15-21 each show different examples of how an input image of an input video stream may be used to generate an output image that is added to a conference user interface to display to conference endpoints. In the examples starting with FIG. 15, the room setup shows an arial view of the room (1502) and is not an actual image used by the video processing system. The camera view (1504) in the middle of each of the Figures is the input image. The right side (1506) shows an example of the conference user interface. The conference user interface has multiple panes (1508, 1510, 1512, 1514), where each pane is for a different conference endpoint. In the example, the top left pane of the conference user interface is allocated to the conference endpoint of the conference room. The remaining panes are allocated to other endpoints. The generation of the head frames for filling in the conference pane is performed as described in the present application.

Figure 15:
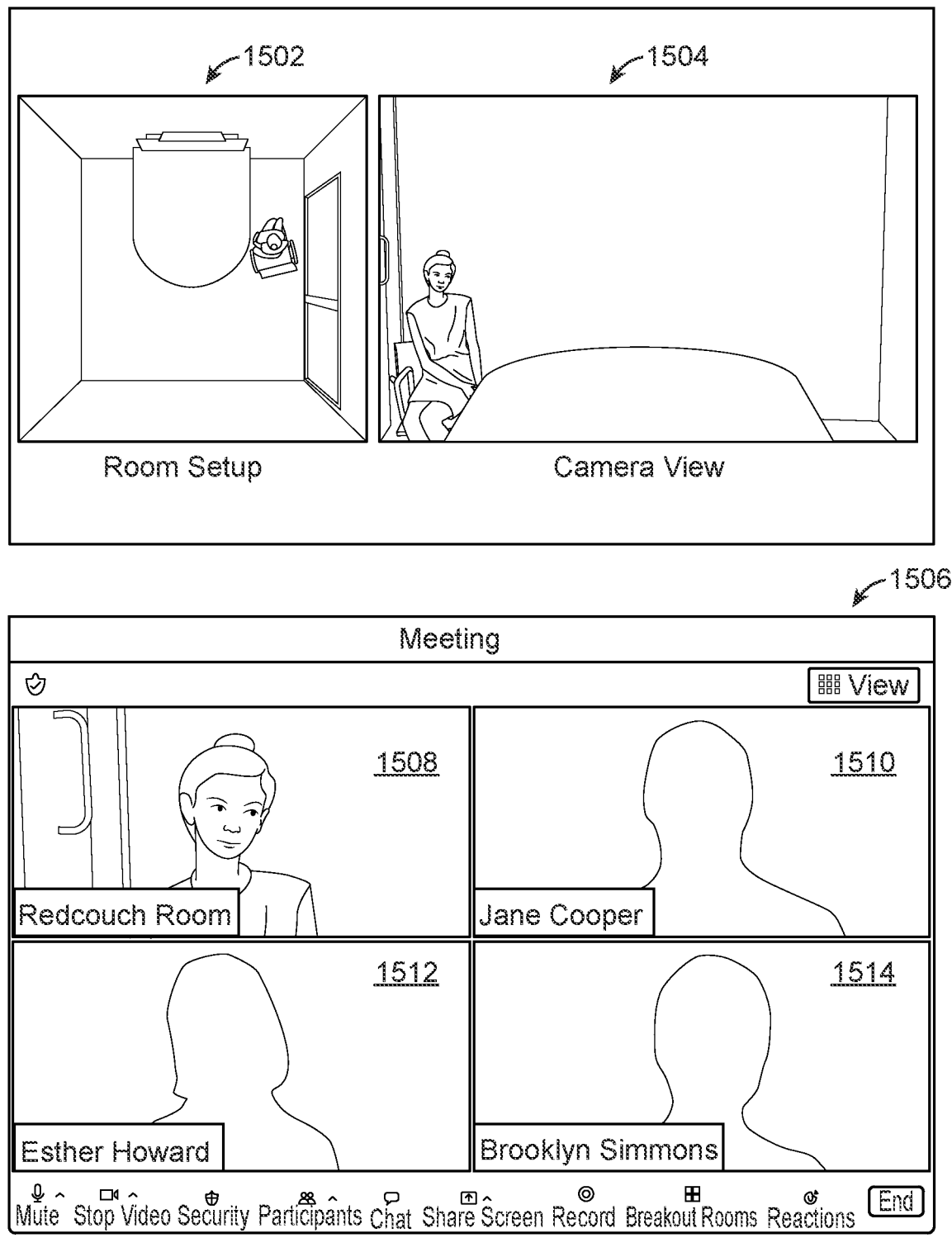

FIG. 15 shows the example with the output image of the video processing system when a single person is in the conference room. As shown, most of the unused area of the conference room is not shown in order to show a larger image of the people. Further, the focus is on the individuals' heads. Thus, the conference participants may have a more interactive experience with each other regardless of whether they are in the same conference room.

Although the example figures show the allocation of the entire conference room to a single pane, each head frame may be allocated to a separate pane of the conference user interface. The allocation may be performed, for example, if the output image is a set of sub-images that are separated by frames. As another example, if the conference system that generates the conference user interface also generates the head frames, then the conference system may assign each head frame to a pane. Thus, the conferencing system may generate a conference user interface that allocates an equal size to the participants of the conference regardless of whether the participant is in the conference room. In such a scenario, the layout of the head framing may be ignored in favor of the layout of the conference user interface.

Figure 16:
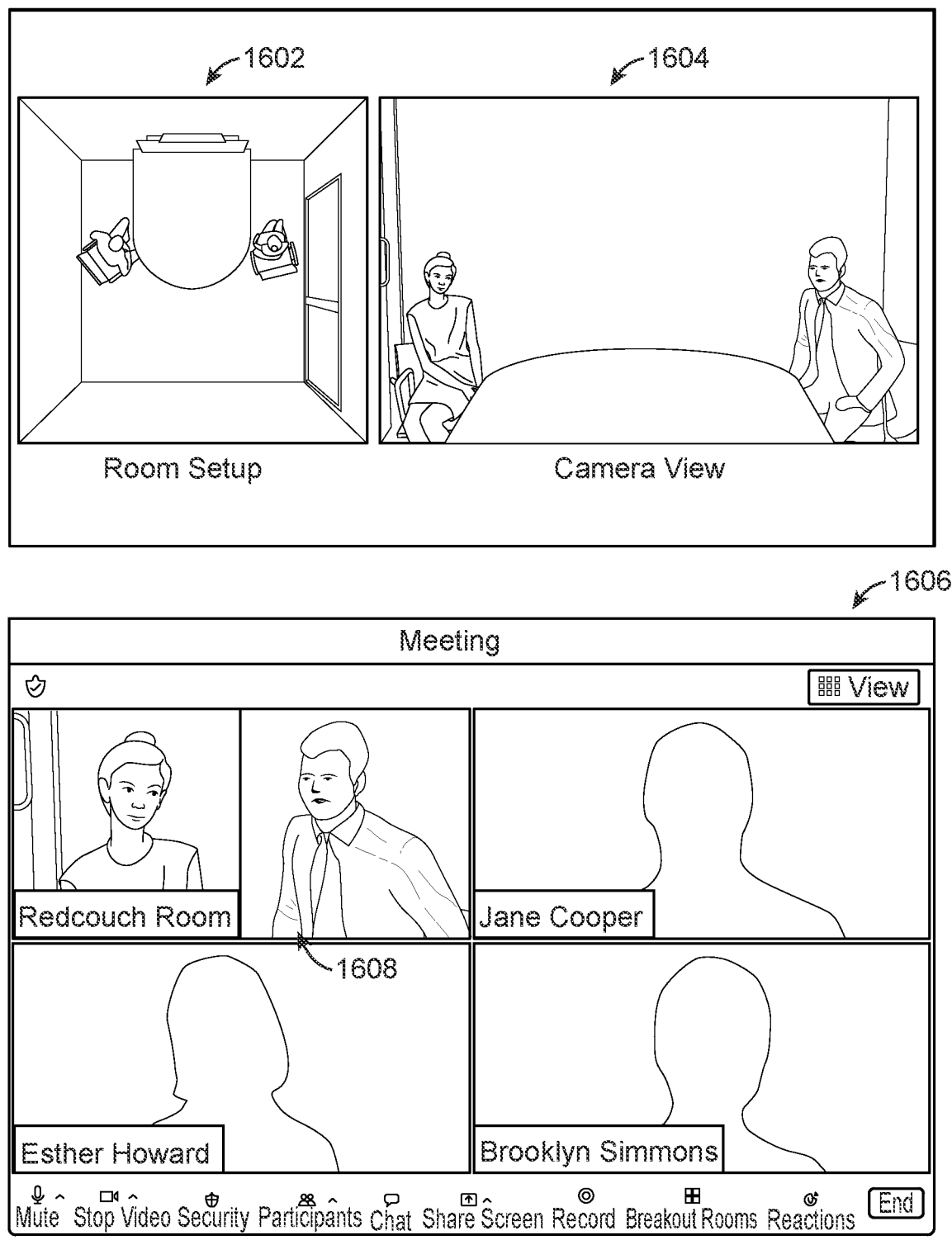

FIG. 16 shows the example with the output image of the video processing system when two people are in the conference room as shown by arial view (1602). Within the image (1604), the head detection model detects two heads. Thus, the layout and the template for two heads are obtained and used to generate pane (1608) in the conference interface (1606).

Figure 17:
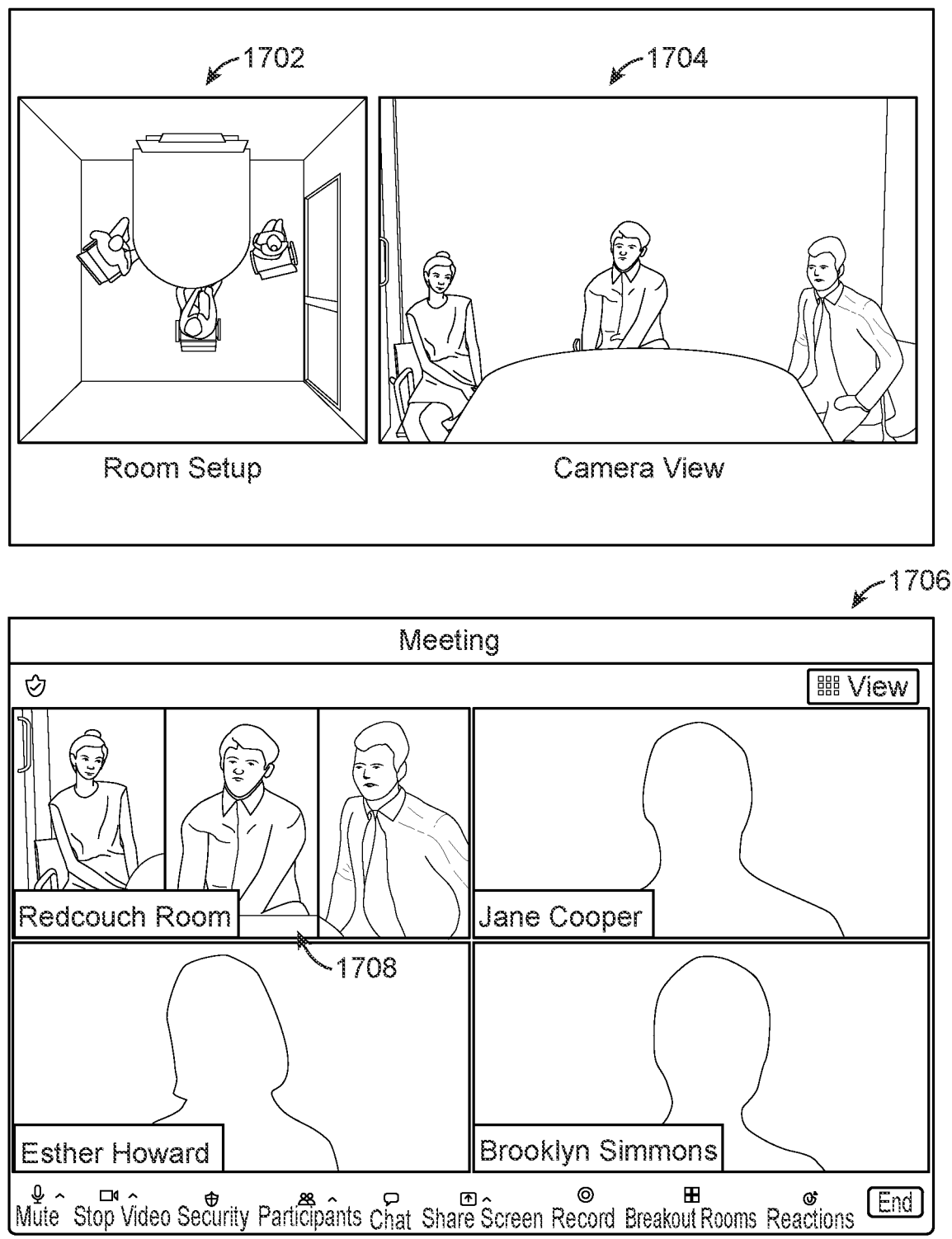

FIG. 17 shows the example with the output image of the video processing system when a third person joins the conference room as shown by arial view (1702). Within the image (1704), the head detection model detects the three heads. Thus, the layout and the template for three heads are obtained and used to generate pane (1708) in the conference interface (1706).

FIG. 18 shows the example with the output image of the video processing system when four people are in the conference room as shown by arial view (1802). Within the image (1804), the head detection model detects the four individual heads. Thus, the layout and the template for four heads are obtained and used to generate pane (1808) in the conference interface (1806).

FIG. 19 shows the example with the output image of the video processing system when five people are in the conference room. Within the image (1904), the head detection model detects the five individual heads. Thus, the layout and the template for five heads are obtained and used to generate pane (1908) in the conference interface (1906).

FIG. 20 shows the example with the output image of the video processing system when six people are in the conference room. Within the image (2004), the head detection model detects the six individual heads. Thus, the layout and the template for six heads are obtained and used to generate pane (2008) in the conference interface (2006).

Next, consider the scenario in which one more person joins the conference room. FIG. 21 shows the example with the output image of the video processing system when seven people are in the conference room. The head detection model detects the seven individual heads in the image (2104). Because the number of heads exceed a maximum number of heads, which is configurable in the system, the head framing is stopped, and the system reverts to group framing Thus, the pane with group frame (2108) is generated in the conference interface (2106).

As shown, one or more embodiments greatly improve meeting equity. To the end user, the output of the video processing system appears to have individual conference streams for each participant whereby the individual conference streams are formatted according to the head framing. The video processing system monitors the frames to determine whether reframing should be performed as described above.

The framing described herein may include the following features. Multiple types of templates for head frames exist. The templates include square frames, column frames and one half merged column headframes for different layouts for a single stream. Further, the number of heads relate to the layout. The assignment of people to the layout is based on positioning in the room. Further, within a head frame, the sizes of peoples' heads remain consistent. Thus, regardless of distances of people to the camera, the peoples' head sizes are at least approximately the same as defined by the templates. Further, one or more embodiments have defined reframe triggers that respond to events of people moving in the room so as to no longer be in a head frame.

The framing may be used in a case of a hybrid mode of a conference meeting. In a hybrid mode, some people of the conference have their own conference endpoints while other people of the conference are in a conference room in which the conference endpoint is shared across the conference room. For example, when people join in conference meeting from home, they get a dedicated camera showing a single video of them. In contrast, when people gather in a conference room in office for meetings, there will be a single video that shows the entire in-room with multiple participants. This leads to meeting inequality in hybrid meetings. The meeting inequity is that the people at home are allocated a larger percentage space in a conference user interface than the people in the conference room. Further, the conference room may further have larger areas than the person at home in which no person is located. Namely, the camera in the conference room may capture a larger amount of unused space than the dedicated camera. The framing described herein may reduce or eliminate the meeting inequity by reducing the unused space and focusing the video stream on the participants. Thus, the framing may be used in a case of real-time, live meeting between participants.

Figure 22:
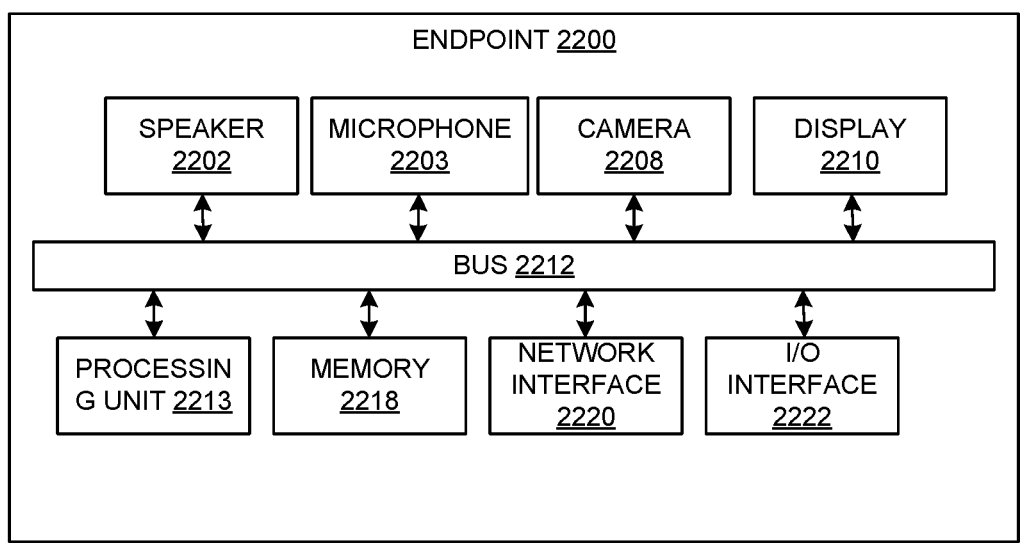
FIG. 22 shows an endpoint in accordance with one or more embodiments.

FIG. 22 shows an example of an endpoint (2200). The endpoint (2200) is used to participate in video conferences.

Embodiments of the endpoint (2200) include video conferencing apparatuses, which may include mobile phones, laptop computers, desktop computers, tablet computers, video bars, etc. The endpoint (2200) of FIG. 22 communicates with one or more remote endpoints over a network using the network interface (2220). The endpoint (2200) includes multiple hardware and software components.

The speaker (2202) converts electrical audio signals into corresponding sound that may be heard by the users of the endpoint (2200). The speaker (2202) may be one of multiple speakers that are part of the endpoint (2200).

The microphone (2203) converts sound to corresponding electrical audio signals. The sound includes the speech of the users of the endpoint (2200). The microphone (2203) may be one of multiple microphones that are part of the endpoint (2200).

The camera (2208) converts light to corresponding electrical images and video. In one embodiment, the camera includes joints and motors to control the direction the camera is pointing and the amount of zoom of the camera. The camera (2208) may be one of multiple cameras that are part of the endpoint (2200).

The display (2210) converts electrical signal to corresponding images that may be viewed by users of the endpoint (2200). In one embodiment, the display (2210) may be a touch sensitive display that converts touch inputs from a user to electrical signals. The display (2210) may be one of multiple displays that are part of the endpoint (2200).

The bus (2212) is a communication system that transfers data between the components inside the endpoint (2200). The bus (2212) may use electrical or optical signals to transfer data between the components.

The processing unit (2213) is a collection of digital circuits that process the data and information captured and used by the endpoint (2200). The processing unit (2213) may include one or multiple processors. The processing unit (2213) executes the programs stored in the memory (2218). The programs include software instructions in the form of computer readable program code that, when executed, cause the endpoint (2200) to perform the operations of the embodiments of the disclosure.

The memory (2218) is a collection of circuits that are used to store information used by endpoint (2200). The memory (2218) stores programs and data that are executed and used by the processing unit (2213). The memory (2218) may include volatile memory and nonvolatile memory.

The network interface (2220) is the point of connection between the endpoint (2200) and other networks and endpoints. The network interface (2220) may include interfaces for wired networks (e.g., ethernet) and wireless networks (e.g., wireless local area network (WLAN), mobile phone networks, etc.).

The input/output (I/O) interface (2222) is the point of connection between the endpoint (2200) and I/O devices. The input/output (I/O) interface (2222) may include physically connected interfaces (e.g., universal serial bus (USB)) and wireless interfaces (e.g., personal area networks (PAN)). The input/output (I/O) interface (2222) may connect the endpoint to keyboards and mice, as well as to additional speakers, microphones, cameras, displays, etc.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention, which may include transmitting, receiving, presenting, and displaying data and messages described in the other figures of the disclosure.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and steps shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, or is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
    obtaining, using a head detection model and for an image of a video stream, head detection information that identifies a plurality of heads detected in the image;
    selecting a layout based on a number of the plurality of heads detected in the image;
    identifying a set of templates corresponding to a layout;
    creating, individually, a plurality of head frame definitions for the plurality of heads using the set of templates;
    generating an image frame definition combining the plurality of head frame definitions;
    obtaining, from the head detection information, a head detection bounding box for a head of the plurality of heads;
    adding a buffer around the head detection bounding box;
    defining, using the buffer and a template of the plurality of templates, a zoom amount and an alignment for a head frame definition; and
    processing the video stream using the image frame definition, wherein defining the zoom amount and the alignment comprises aligning the buffer to a top headline and bottom headline of the template.

2. The method of claim 1, further comprising:
assigning the plurality of heads identified in the head detection information to a plurality of locations in the layout.

3. The method of claim 2, further comprising:
assigning the plurality of heads in order from left to right in the image in order of top to bottom and left to right of the plurality of locations.

4. The method of claim 2, wherein creating the plurality of head frame definitions comprises:
selecting a head of the plurality of heads to obtain a selected head,
creating a head frame definition for the selected head using a template in the set of templates, the template corresponding to a location of the plurality of locations, and
adding the head frame definition to the image frame definition.

5. The method of claim 1, further comprising:
monitoring the video stream for movement of the plurality of heads.

6. The method of claim 1, further comprising:
determining, after applying a template of the plurality of templates, that the head frame definition specifies a region extending beyond the image; and
adjusting the region specified by the head frame definition to be entirely within the image.

7. The method of claim 6, wherein adjusting the head frame definition comprises:
moving the region specified by the head frame definition.

8. The method of claim 7, wherein moving the region comprises:
changing the region such that a head being centered as defined by the template is off center.

9. The method of claim 6, wherein adjusting the head frame definition comprises:
changing a zoom amount specified by the head frame definition.

10. The method of claim 1, wherein the layout specifies a plurality of locations for the set of templates, wherein each location of the plurality of locations has a corresponding size, and wherein each template in the set of templates is defined based on the corresponding size.

11. The method of claim 1, further comprising:
making a detection of a person moving outside of a first head frame defined by the head frame definition;
initiating a timer responsive to the detection; and
triggering a reframing responsive to not detecting the person in a second head frame defined by the head frame definition at an elapse of a threshold amount of time according to the timer.

12. The method of claim 1, further comprising:
making a detection of a person moving off center of a first head frame defined by the head frame definition;
initiating a timer responsive to the detection; and
triggering a reframing responsive to the person remaining off center in a second head frame defined by the head frame definition at an elapse of a threshold amount of time according to the timer.

13. A system comprising:
a camera for capturing a video stream;
a video processor within a housing of the camera, the video processor comprising:
a head detection model to generate, for an image of the video stream, head detection information that identifies a plurality of heads detected in the image, and
a frame generator to generate image frame detection information for an image of an input video stream,
wherein generating an image frame definition comprises:
selecting a layout based on a number of the plurality of heads detected in the image;
identifying a set of templates corresponding to the layout;
creating, individually, a plurality of head frame definitions for the plurality of heads using the set of templates;
generating the image frame definition combining the plurality of head frame definitions;
obtaining, from the head detection information, a head detection bounding box for a head of the plurality of heads;
adding a buffer around the head detection bounding box;
defining, using the buffer and a template of the plurality of templates, a zoom amount and an alignment for a head frame definition; and
an image framing processor configured to process the video stream using the image frame definition,
wherein defining the zoom amount and the alignment comprises aligning the buffer to a top headline and bottom headline of the template.

14. The system of claim 13, wherein the video processor further comprises:
a plurality of timers to trigger reframing of a head frame definition.

15. A method comprising:
obtaining, using a head detection model and for an image of a video stream, head detection information that identifies a plurality of heads detected in the image;
selecting a set of templates for the plurality of heads;
creating, individually, a plurality of head frame definitions for the plurality of heads using the set of templates;
making a detection of a person moving off center of a first head frame defined by a head frame definition;
initiating a timer responsive to the detection;
triggering a reframing responsive to the person remaining off center in a second head frame defined by the head frame definition at an elapse of a threshold amount of time according to the timer; and
processing the video stream using the plurality of head frame definitions.

* * * * *